US011363081B2

(12) United States Patent
Sanvidge et al.

(10) Patent No.: US 11,363,081 B2
(45) Date of Patent: Jun. 14, 2022

(54) METHOD AND SYSTEM FOR CONDUCTING REMOTE COMMUNICATIONS AT A FUNERAL HOME

(71) Applicants: Kathleen A. Sanvidge, Ballston Lake, NY (US); Zoltan Prohaszka, Ballston Lake, NY (US)

(72) Inventors: Kathleen A. Sanvidge, Ballston Lake, NY (US); Zoltan Prohaszka, Ballston Lake, NY (US)

( * ) Notice: Subject to any disclaimer, the term of this patent is extended or adjusted under 35 U.S.C. 154(b) by 0 days.

(21) Appl. No.: 17/230,462

(22) Filed: Apr. 14, 2021

(65) Prior Publication Data
US 2021/0329045 A1 Oct. 21, 2021

Related U.S. Application Data

(60) Provisional application No. 63/010,973, filed on Apr. 16, 2020.

(51) Int. Cl.
*H04L 65/403* (2022.01)
*H04N 7/18* (2006.01)
(Continued)

(52) U.S. Cl.
CPC ............ *H04L 65/403* (2013.01); *A47B 21/00* (2013.01); *H04N 5/23216* (2013.01);
(Continued)

(58) Field of Classification Search
CPC . H04N 7/15; H04N 7/18; H04N 5/232; H04L 29/06; A47B 21/00
(Continued)

(56) References Cited

U.S. PATENT DOCUMENTS

2003/0214574 A1* 11/2003 Saruhashi ............... H04N 7/148
348/14.01
2013/0222592 A1* 8/2013 Gieseke ........... G08G 1/096708
348/148
(Continued)

FOREIGN PATENT DOCUMENTS

CA 2695155 9/2011
CA 2695155 A1 * 9/2011 ........... H04N 21/643
(Continued)

OTHER PUBLICATIONS info@distantlink.com, Full feature video casting for funerals made easy, 2014 DistantLink Inc., webpage.

*Primary Examiner* — Melur Ramakrishnaiah
(74) *Attorney, Agent, or Firm* — Heslin Rothenberg Farley & Mesiti, P.C.

(57) ABSTRACT

A method for conducting remote communications at a funeral home in accordance with one or more aspects of the present disclosure is presented. The method includes providing a first video conference system positioned in a funeral home. A second video conference system is positioned in a vehicle structure remotely located from the funeral home. The vehicle structure is operable to have vehicles driven into and out of the vehicle structure. A communication link is established between the first and second video conference systems. One or more family members are enabled to gather at the funeral home for a funeral service of a loved one. One or more passengers are driven in a first vehicle into the vehicle structure. While the one or more passengers remain in the first vehicle, the one or more passengers and the one or more family members communicate via the communication link.

36 Claims, 15 Drawing Sheets

(51) Int. Cl.
*A47B 21/00* (2006.01)
*H04N 5/232* (2006.01)

(52) U.S. Cl.
CPC ...... *H04N 7/181* (2013.01); *A47B 2200/0075* (2013.01); *A47B 2200/0079* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 2014/0156506 A1* | 6/2014 | Grigg | G06Q 20/3223 705/39 |
| 2016/0191582 A1 | 6/2016 | Shivaram | |
| 2018/0276776 A1 | 9/2018 | Morrow | |
| 2019/0104325 A1 | 4/2019 | Linares et al. | |
| 2019/0133863 A1 | 5/2019 | Borovinov | |
| 2019/0362560 A1* | 11/2019 | Choi | G06F 3/011 |
| 2020/0202649 A1* | 6/2020 | O'Toole | G07C 9/00912 |

FOREIGN PATENT DOCUMENTS

| | | |
|---|---|---|
| JP | 2002049711 | 3/2005 |
| KR | 20030081707 | 10/2003 |
| KR | 20190093306 | 8/2019 |
| WO | 2008077044 | 6/2008 |

* cited by examiner

METHOD AND SYSTEM FOR CONDUCTING REMOTE COMMUNICATIONS AT A FUNERAL HOME

BACKGROUND

When a friend, colleague or family member dies, often times it is a challenge to physically visit a funeral home in order to pay one's respect and offer condolences to the immediate family members. For example, friends or family of a deceased person may be located thousands of miles from where funeral services of the deceased are being held. Also, handicapped individuals, wanting to pay their last respects to the deceased, may have trouble getting out of a vehicle unassisted and traversing from the funeral home parking lot into the funeral home itself.

Moreover, uncontrolled man-made or natural events, crises or acts of nature may impose obstacles that are difficult to overcome when getting to a funeral home service. For example, weather conditions or natural disasters may restrict travel, especially travel over long distances.

In the specific case of a pandemic, people may be required to exercise social distancing in order to stay safe. Further, various national, state or local governments may restrict visitations to a funeral service to only immediate family members. Even delivering cards, gifts or other items to the immediate family members during the funeral service may be challenging during a pandemic due to the need to have the items sanitized prior to delivery.

Accordingly, there is a need for systems and methods that enable individuals to offer condolences to family members at a funeral service remotely when, for example, they are separated by large distances. Further, there is a need to offer condolences safely when exercising social distancing. Also, there is a need to offer condolences without having to get out of a vehicle because of, for example, a handicapped condition of the passenger in the vehicle.

BRIEF DESCRIPTION

The present disclosure offers advantages and alternatives over the prior art by providing systems and methods for conducting remote communications at a funeral home. The systems and methods enable individuals to gather at a remote station and interactively conduct a video conference visitation with immediately family members at a funeral home during a funeral service. The remote station may enable passengers in a vehicle to drive up to a video conference system and communicate with the immediate family members without having to leave the vehicle. Alternatively, the passengers may leave recorded video messages at any time before or after a funeral service, that may be delivered to the immediate family members at a later time.

A method for conducting remote communications at a funeral home in accordance with one or more aspects of the present disclosure is presented. The method includes providing a first video conference system positioned in a funeral home. A second video conference system is positioned in a vehicle structure remotely located from the funeral home. The vehicle structure is operable to have vehicles driven into and out of the vehicle structure. A communication link is established between the first and second video conference systems. One or more family members are enabled to gather at the funeral home for a funeral service of a loved one. One or more passengers are driven in a first vehicle into the vehicle structure. While the one or more passengers remain in the first vehicle, the one or more passengers and the one or more family members communicate via the communication link.

A method for conducting remote communications at a facility in accordance with one or more aspects of the present disclosure is presented. The method includes providing a first video conference system positioned in a facility. A second video conference system is positioned in a vehicle structure remotely located from the facility. The vehicle structure is operable to have vehicles driven into and out of the vehicle structure. A communication link is established between the first and second video conference systems. One or more event participants are enabled to gather at the facility to participate in an event. One or more passengers are driven in a first vehicle into the vehicle structure. While the one or more passengers remain in the first vehicle, the one or more passengers and the one or more event participants communicate via the communication link.

A system for conducting remote communications at a facility in accordance with one or more aspects of the present disclosure is presented. The system includes a first video conference system positioned in a facility. A second video conference system is positioned in a vehicle structure remotely located from the facility. The vehicle structure is operable to have vehicles driven into and out of the vehicle structure. A communication link is established between the first and second video conference systems. The communication link is operable to enable communication between one or more passengers of a first vehicle driven into the vehicle structure and one or more event participants gathered at the facility to participate in an event, while the one or more passengers remain in the first vehicle.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 1 depicts an example of a plan view of a system for conducting remote communications at a funeral home, wherein the system includes a first video conference system positioned in a funeral home and a second video conference system positioned in a drive-through remote station located adjacent to the funeral home, the first and second video conference systems having established a communication link between them to enable video conferencing between family members in the funeral home and passengers in a vehicle in the remote station during a funeral service, according to aspects described herein;

Figure 4:
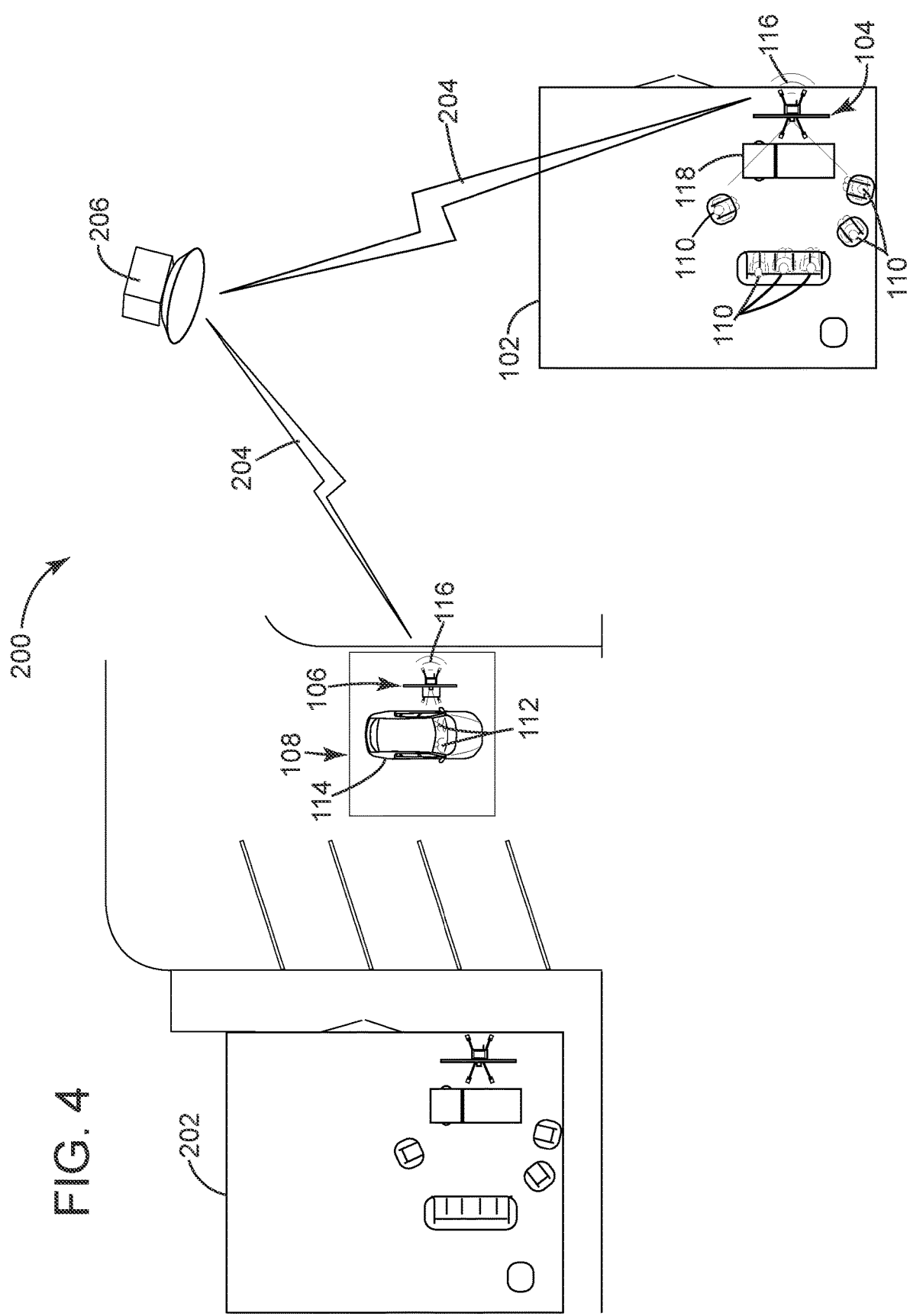
Figure 5:
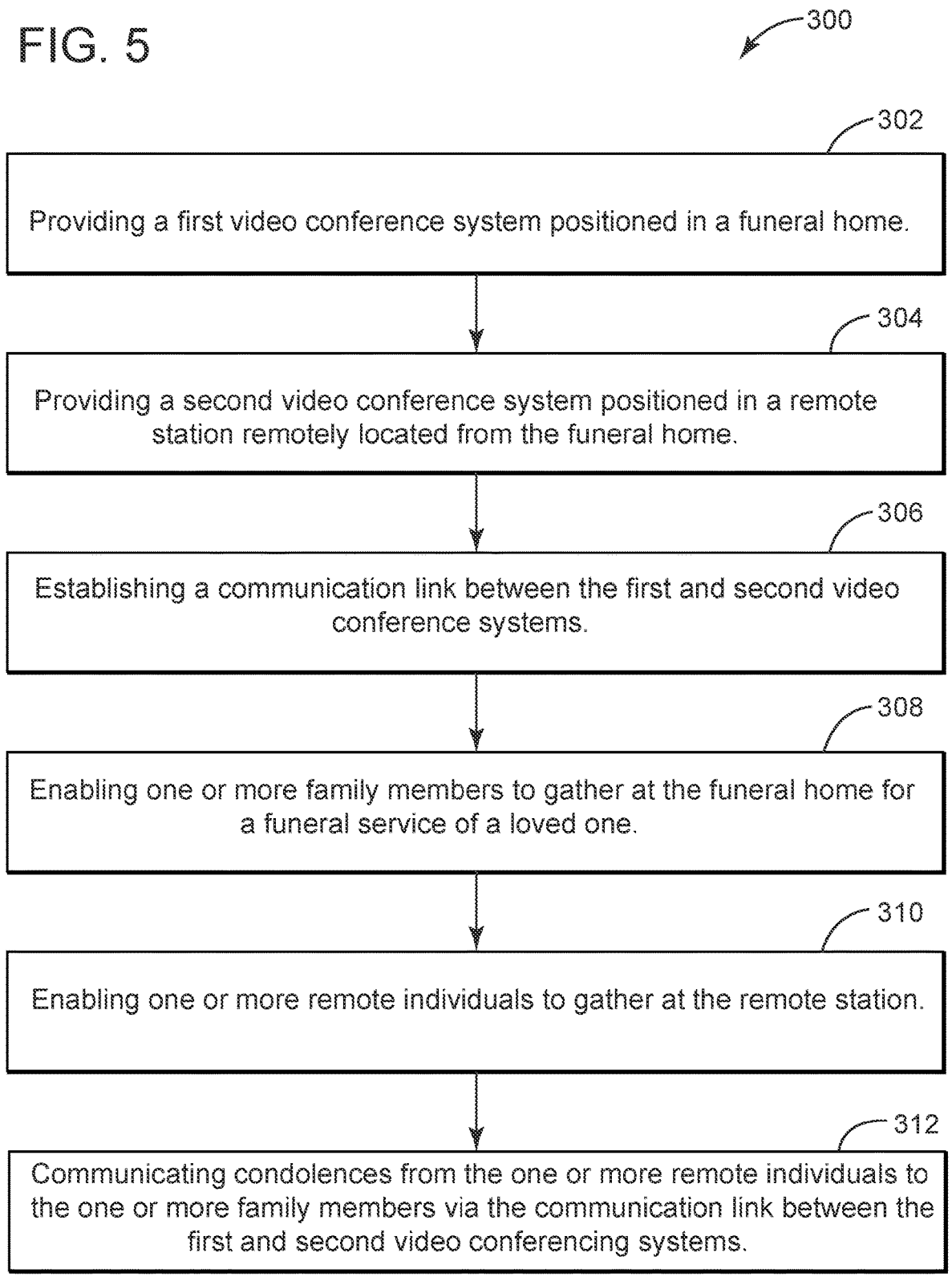

FIG. 4 depicts an example of a plan view of a first video conference system positioned in a first funeral home and a second video conference system positioned in a drive-through remote station located at a second funeral home, according to aspects describe herein; and FIG. 5 depicts an example of a flow diagram of a method of conducting remote communications at a funeral home, according to aspects described herein.

Figure 6:
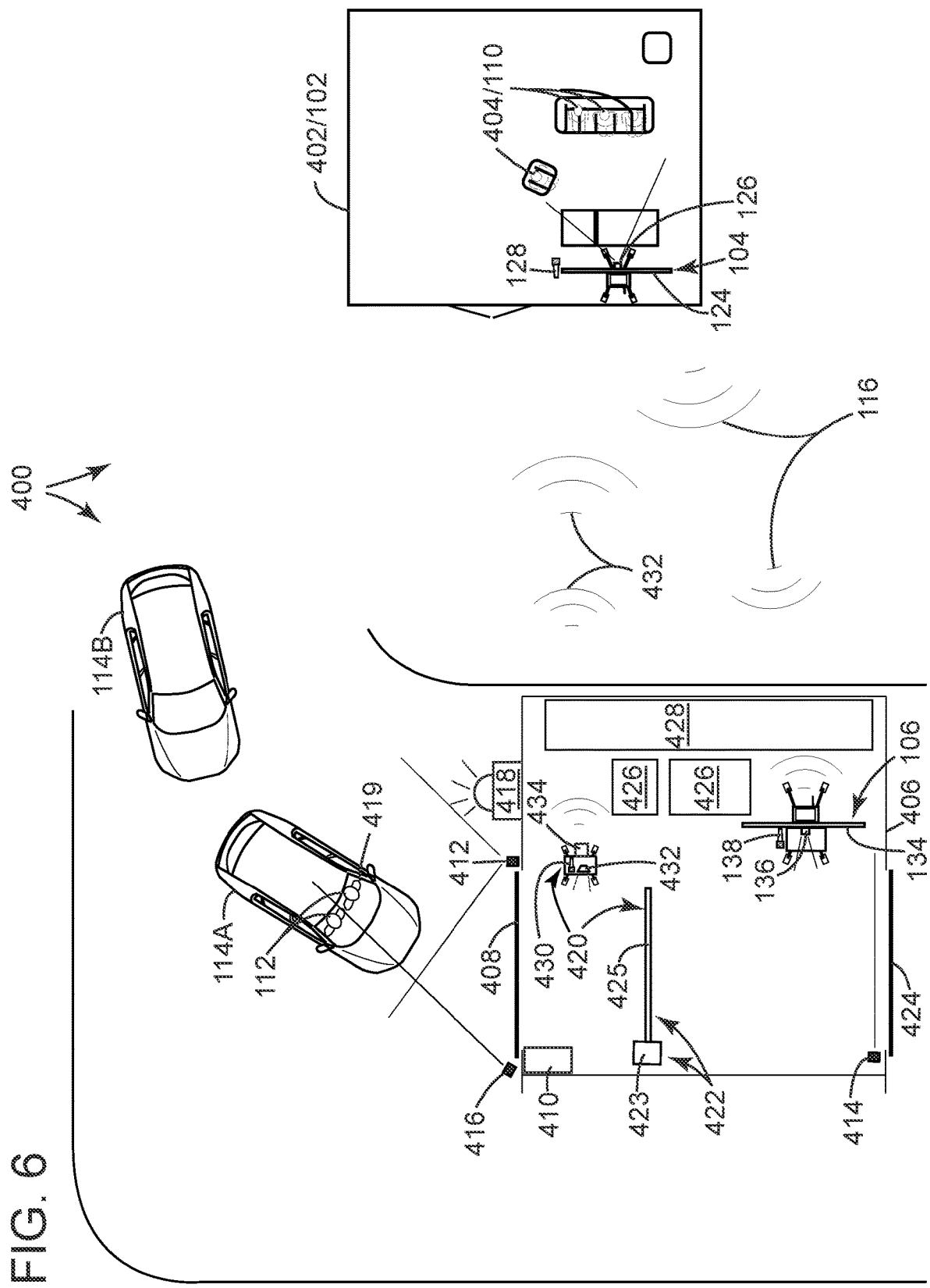
Figure 7:
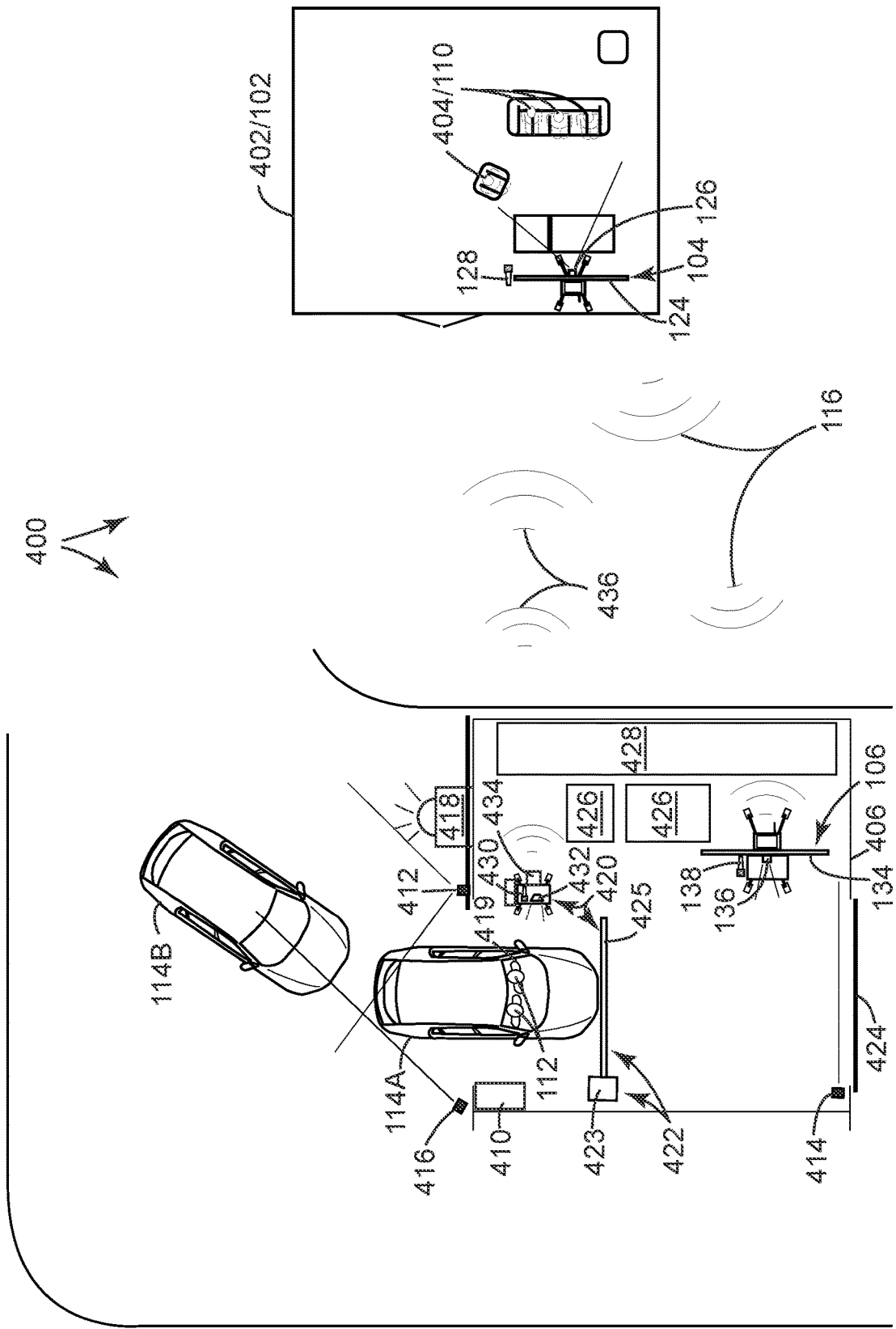
Figure 8:
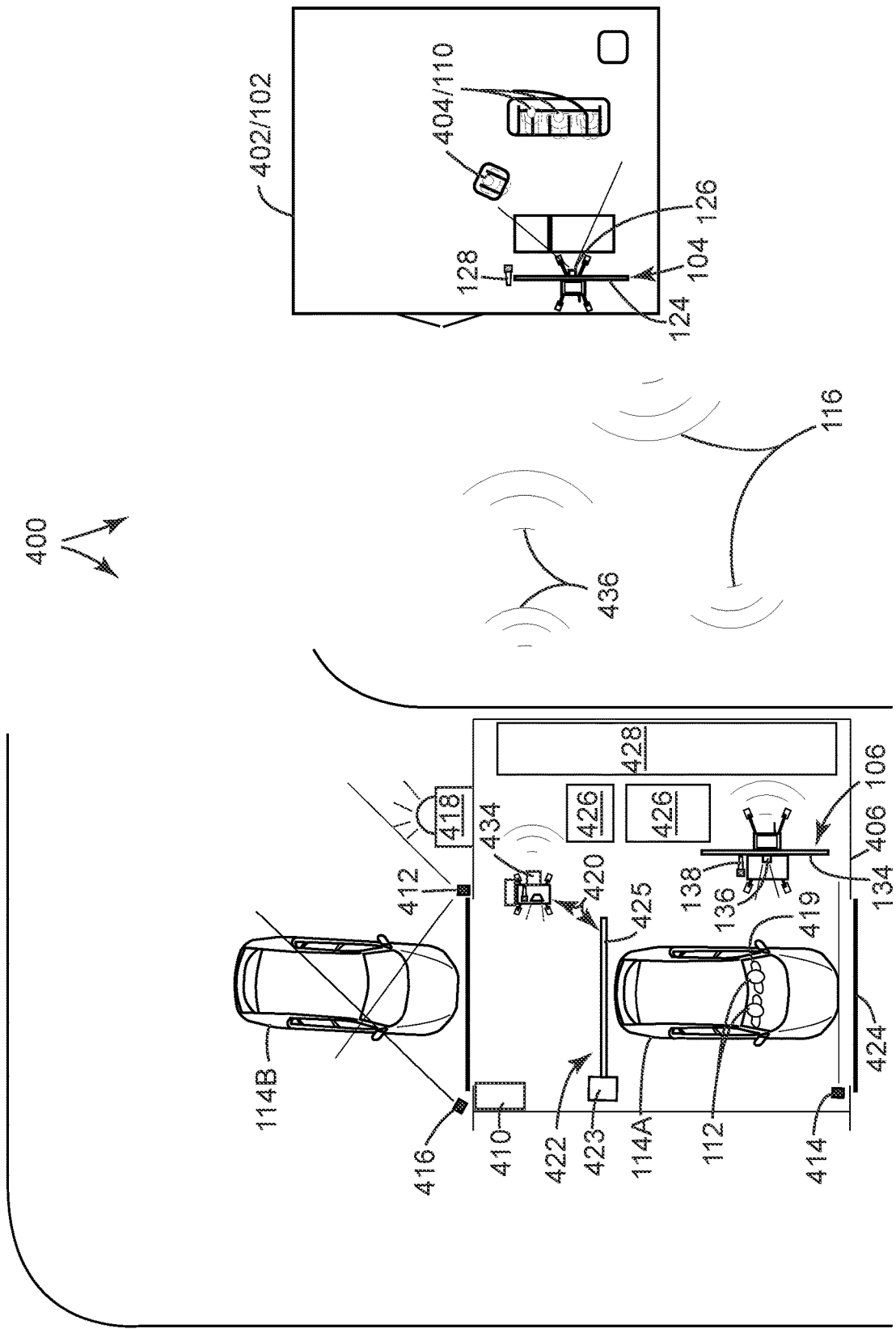
Figure 9:
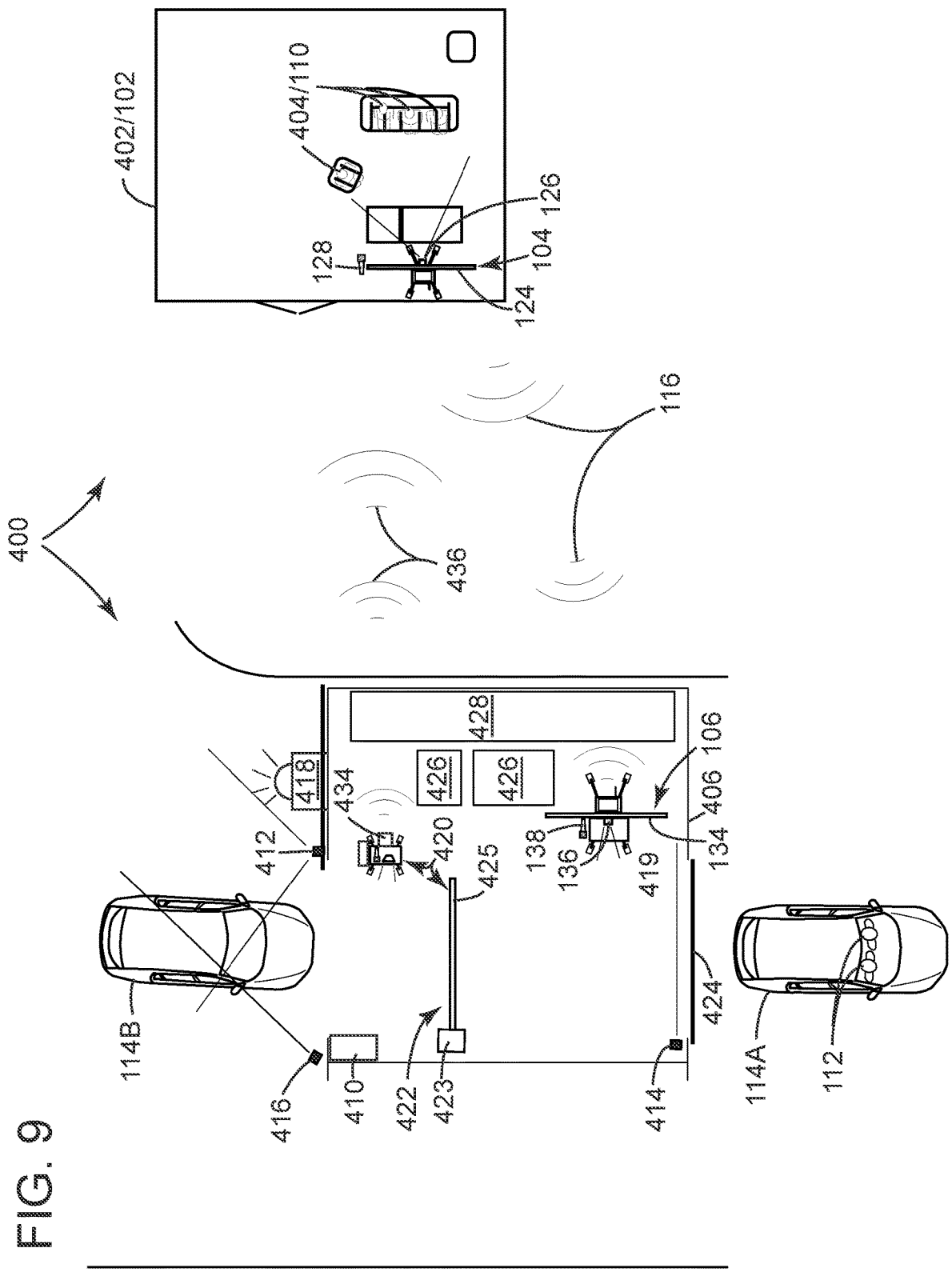
Figure 10:
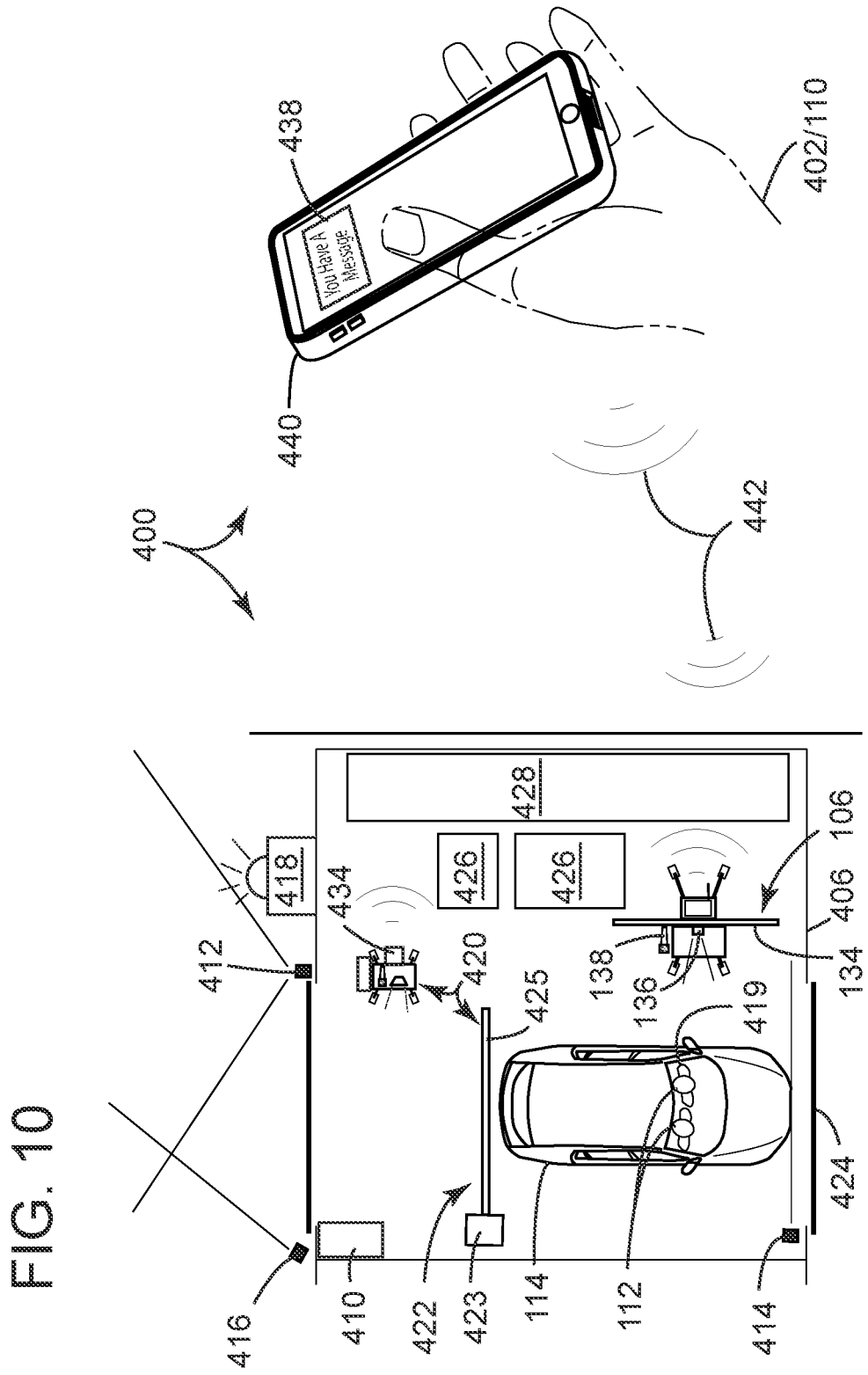
Figure 11:
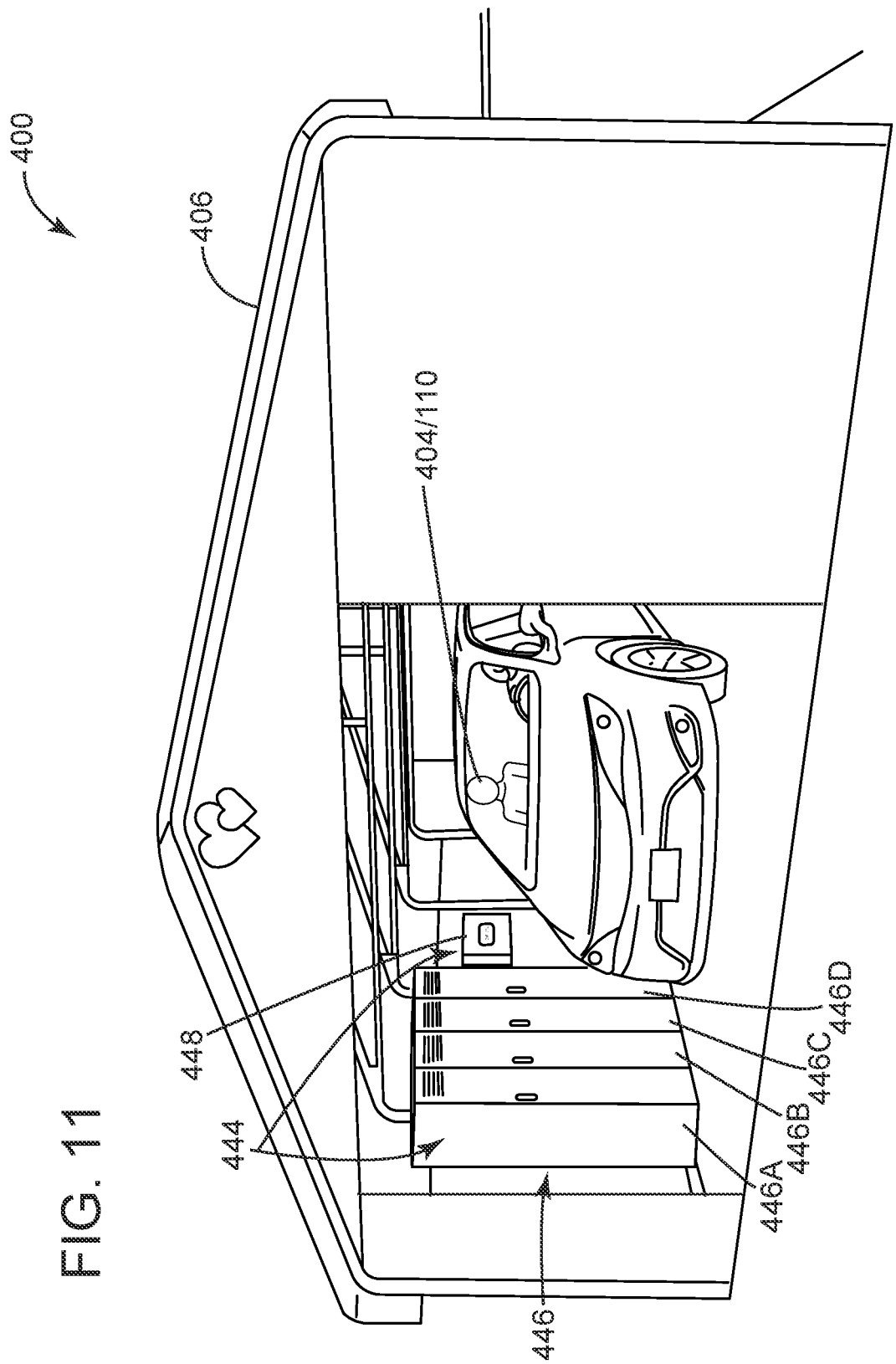
Figure 12:
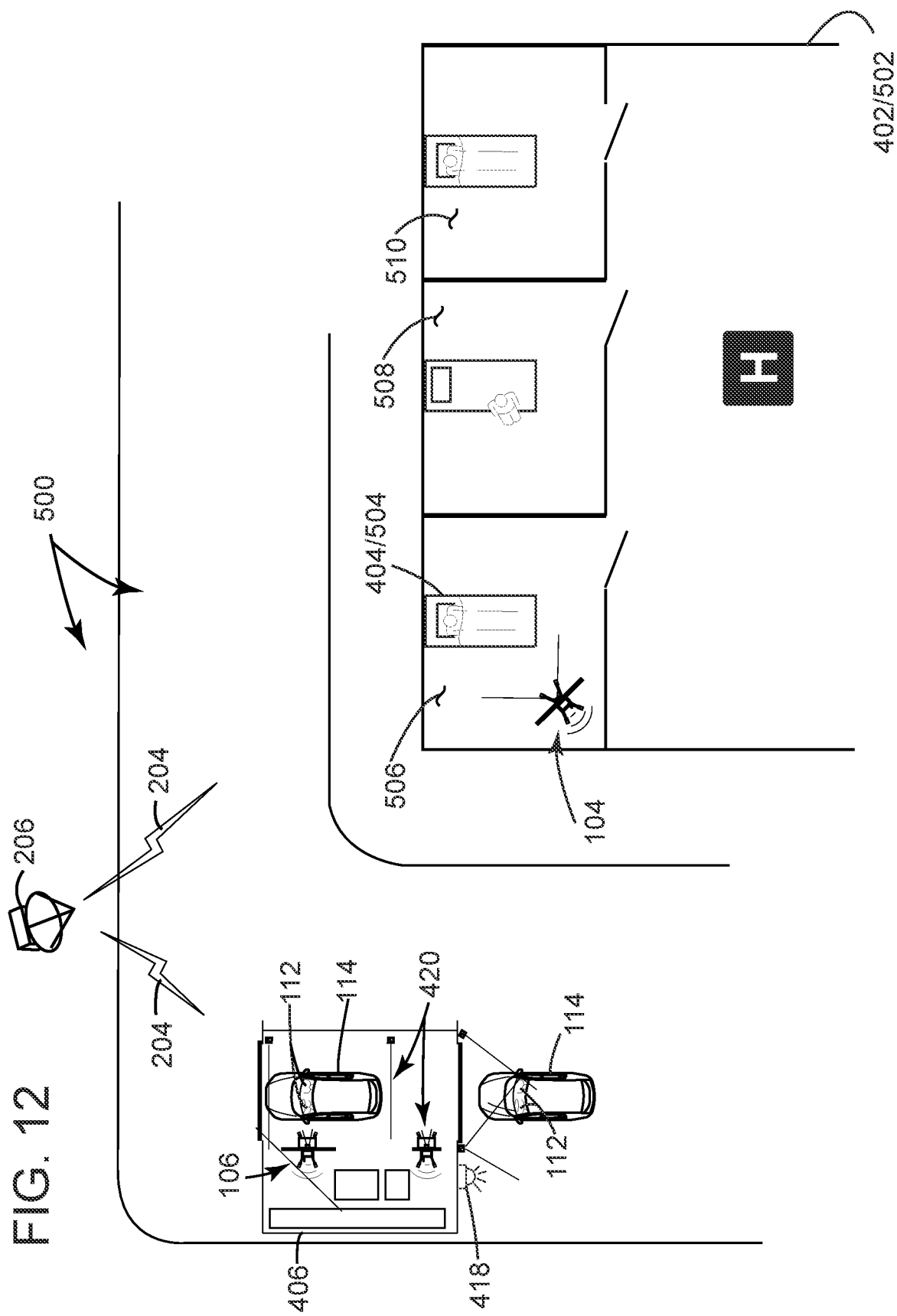
Figure 13:
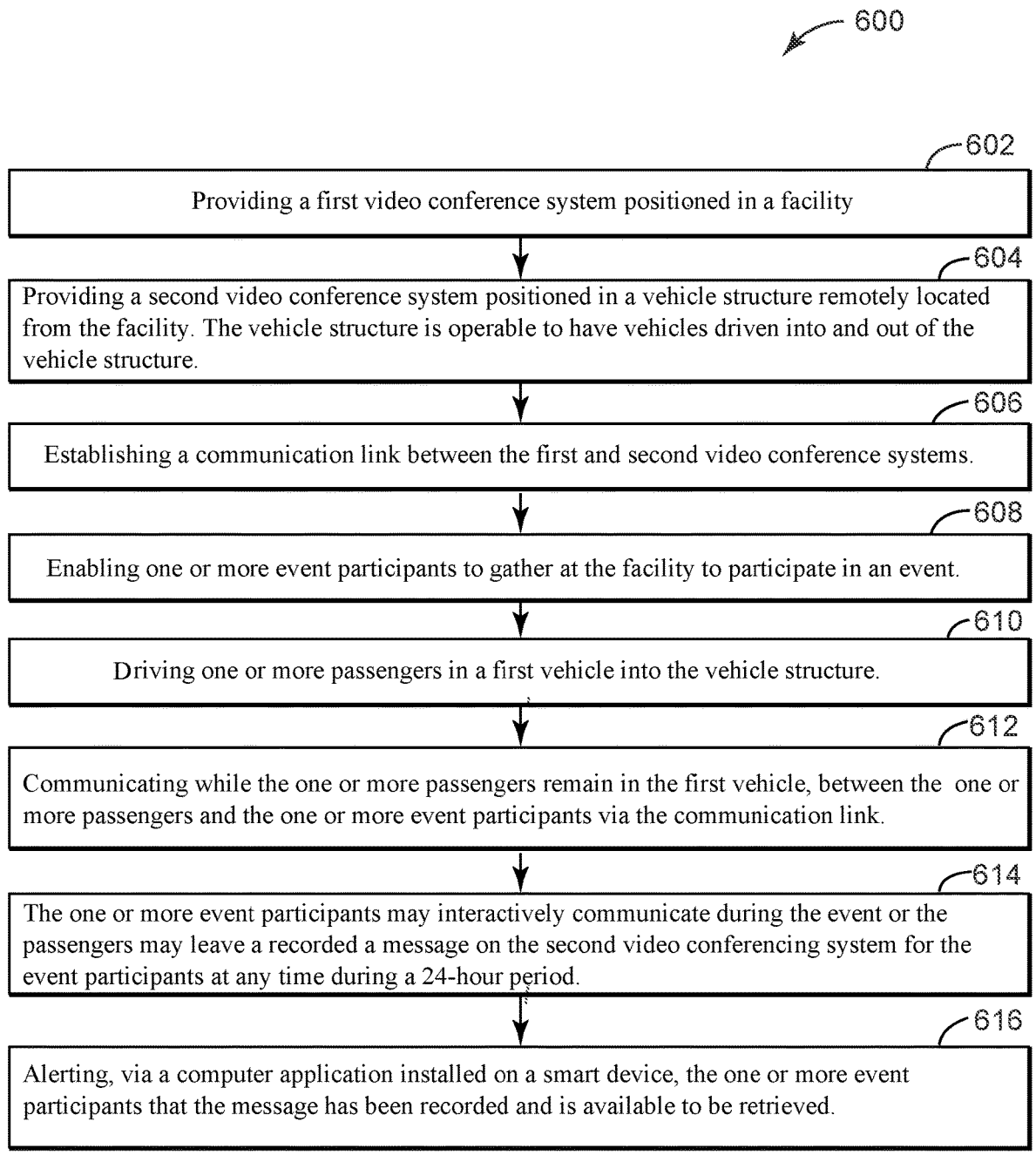
Figure 14:
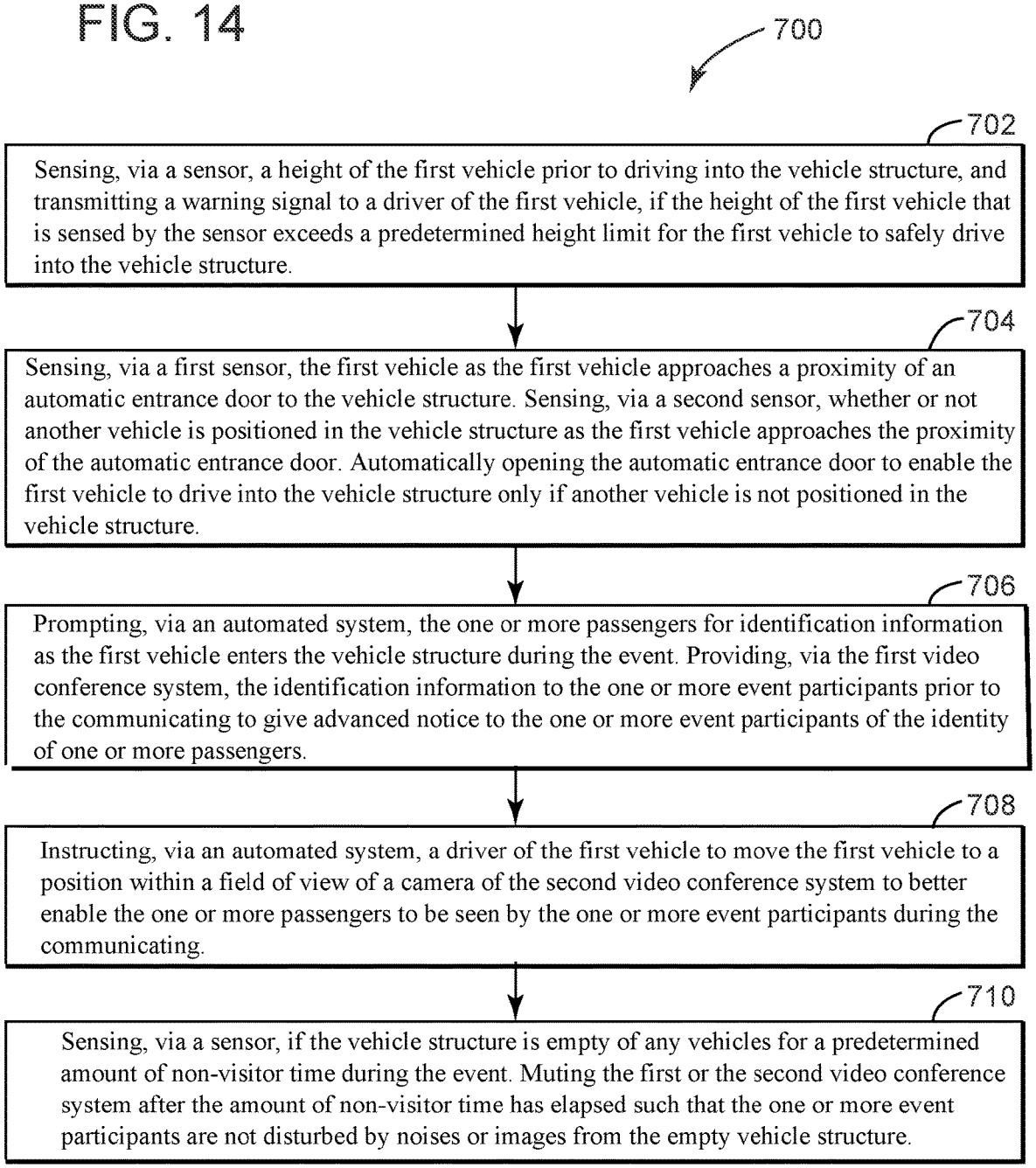
Figure 15:
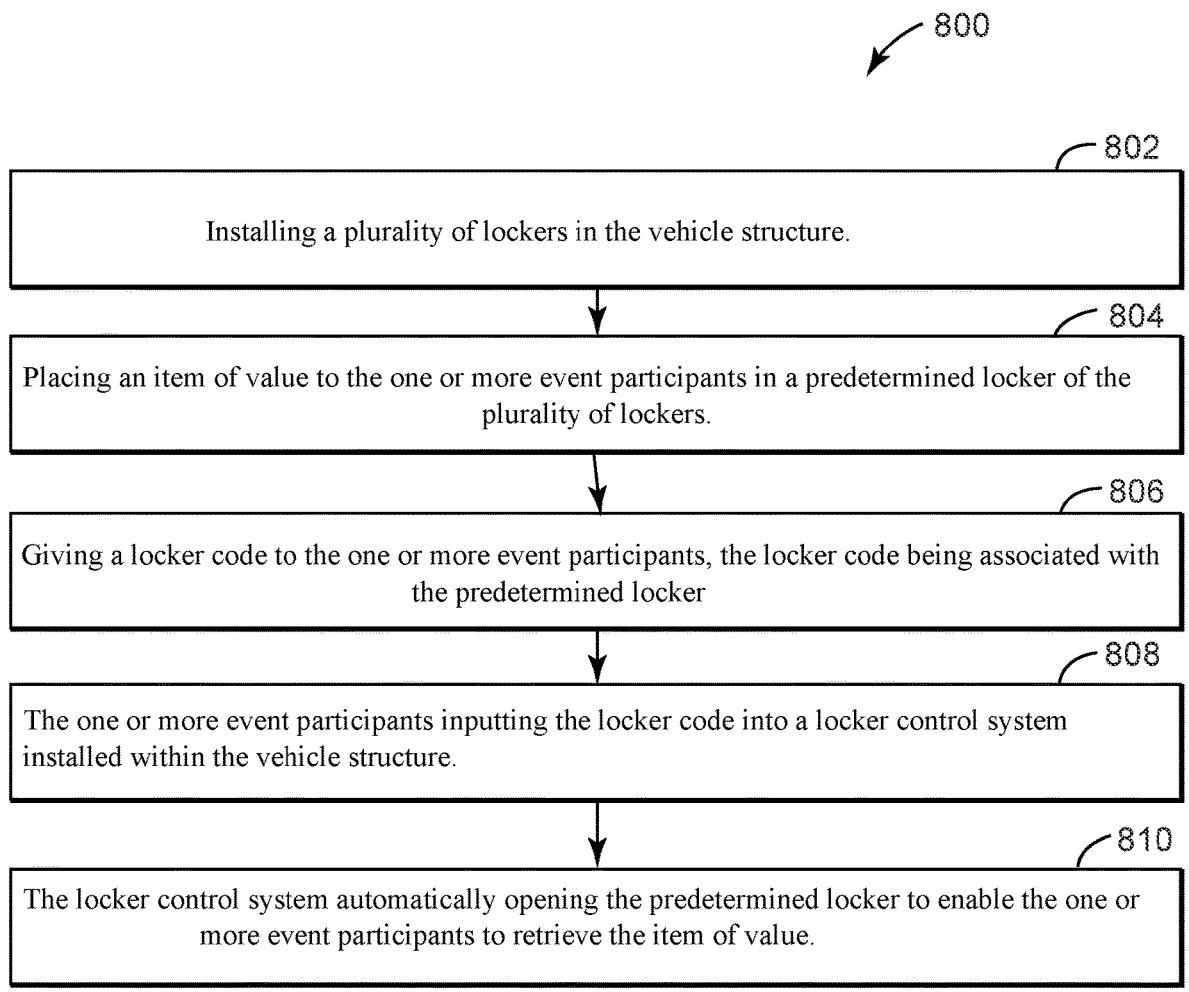

FIG. 6 depicts an example of a plan view of a system for enabling one or more passengers in a vehicle to conduct remote communications at a facility (such as a funeral home), which is hosting an event (such as a funeral service for a loved one) that is attended by event participants (such as one or more family members of the loved one), wherein the system includes a vehicle structure having an automatic entrance door that is in a closed position and the vehicle is approaching the automatic entrance door, according to aspects described herein;

FIG. 7 depicts an example of a plan view of the system of FIG. 6, wherein the automatic entrance door is in an open position and the passengers of the vehicle are being queried for identification information, according to aspects described herein;

FIG. 8 depicts an example of a plan view of the system of FIG. 6, wherein the vehicle is within the vehicle structure and the driver of the vehicle is being instructed to position the vehicle within the field of view of a camera of the system, according to aspects described herein;

FIG. 9 depicts an example of a plan view of the system of FIG. 6, wherein the vehicle has exited the vehicle structure though an automatic exit door and the automatic entrance door is in its open position to allow a second vehicle to enter the vehicle structure, according to aspects described herein;

FIG. 10 depicts an example of a perspective view of a computer application of the system of FIG. 6 that may be installed on a smart device, according to aspects described herein;

FIG. 11 depicts an example of a perspective view of a locker system of the system of FIG. 6, wherein the locker system includes a plurality of lockers and a locker control system, according to aspects described herein;

FIG. 12 depicts another example of a plan view of a system for enabling one or more passengers in a vehicle to conduct remote communications at a facility (such as a hospital), which is hosting an event (such as hospital treatment of a patient) that is attended by event participants (such as one or more family members of the patient), according to aspects described herein;

FIG. 13 depicts an example of a method for conducting remote communications at a facility hosting an event, according to aspects described herein;

FIG. 14 depicts an example of a method for conducting remote communications at a facility hosting an event, wherein the method of FIG. 14 is a continuation of the method of FIG. 13, according to aspects described herein; and FIG. 15 depicts an example of a method for conduction remote communications at a facility hosting an event, wherein the method of FIG. 15 is a continuation of the method of FIG. 13, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
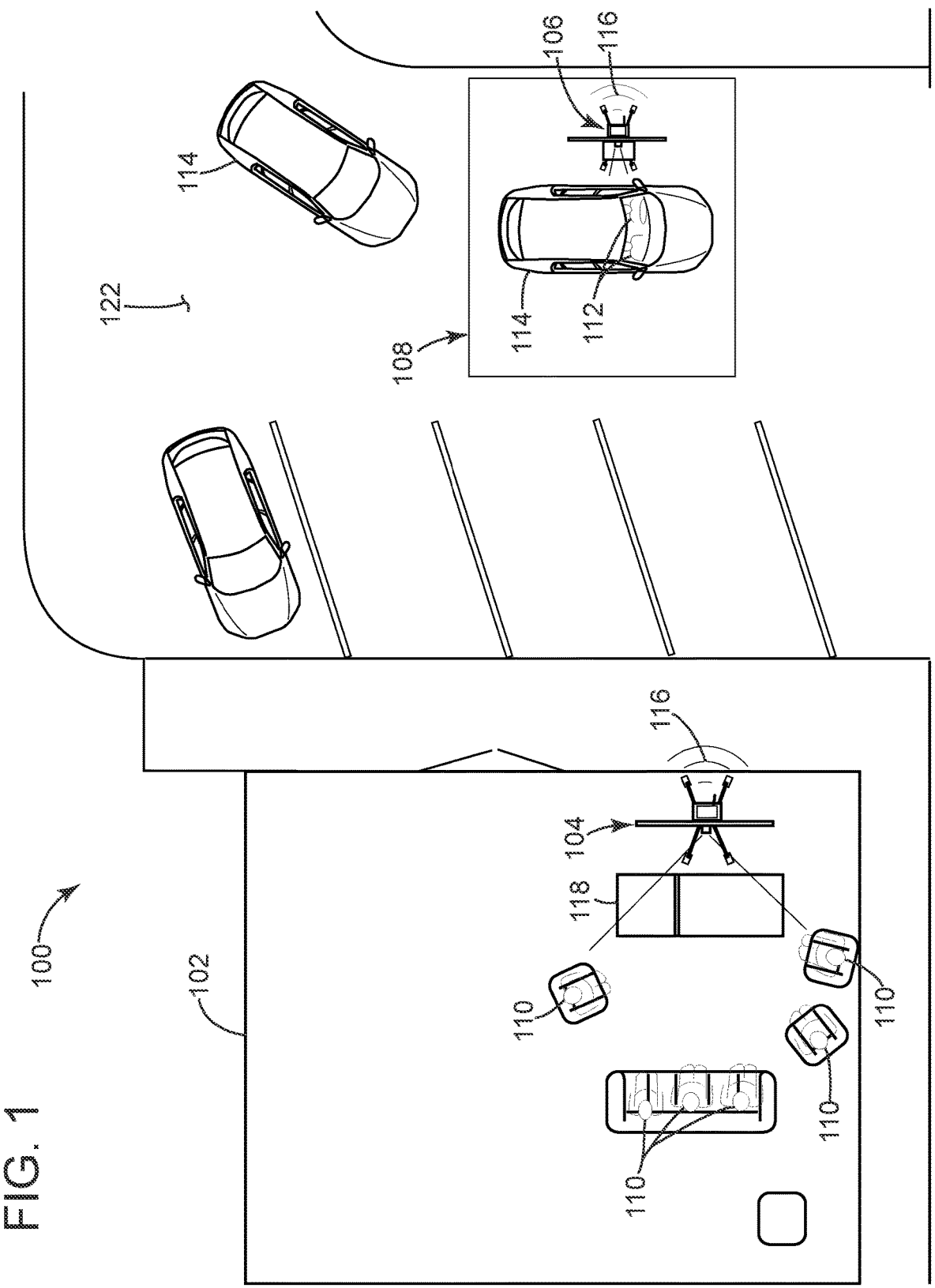

Referring to FIG. 1, an example of a plan view of a system 100 for conducting remote communications at a funeral home 102 is depicted, according to aspect described herein. The system 100 includes a first video conference system 104 positioned in the funeral home 102 and a second video conference system 106 positioned in a drive-through remote station 108 located near the funeral home 102. The first and second video conference systems having established a communication link 116 between them to enable video conferencing between one or more family members 110 in the funeral home 102 and one or more remote individuals 112 who, in this example, are passengers in a vehicle 114 in the remote station 108 during a funeral service, according to aspects described herein. For purposes herein, the term "funeral home" includes any establishment or place of worship or any other location intended for the purpose of funeral services, wakes, memorial services and/or the like. Remote communications as used herein, include any communication of any type between family members at a funeral home and remote individuals positioned at remote locations external to the funeral home.

The funeral service may be, for example, a wake for a deceased loved one in a casket 118 that can be view by both the passengers 112 in the vehicle 114 and the family members 110 in the funeral home 102. The funeral service may also be the beginning of a funeral for burial of the deceased at a cemetery, cremation of the deceased or other options that can carry out the last wishes of the deceased. For purposes herein, a funeral service may include any part before, during or after an event where memorialization of the deceased occurs.

Figure 2:
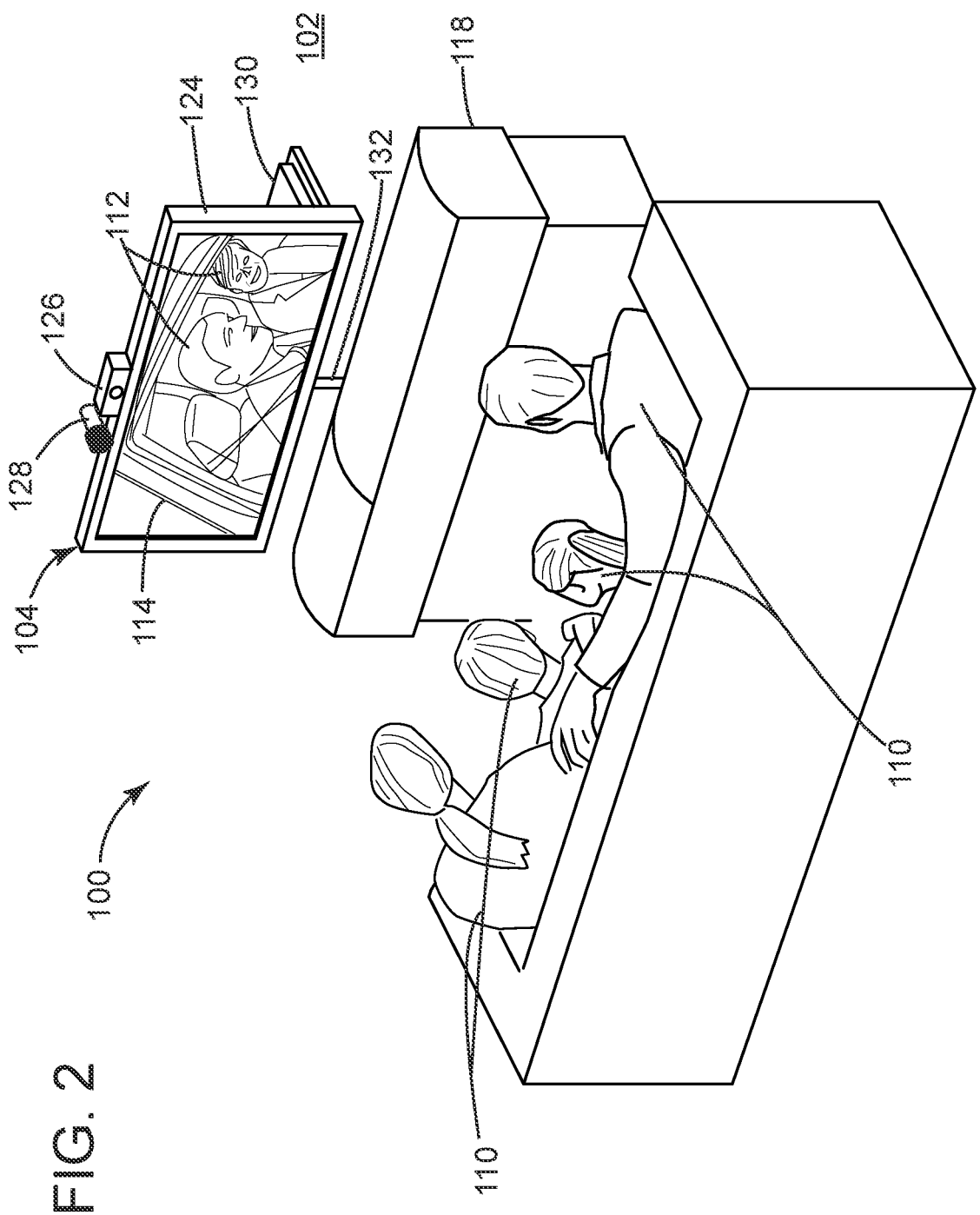
FIG. 2 depicts an example of the first video conference system positioned in the funeral home, wherein the immediate family members are remotely interacting in real time with the passengers in the remote station during the funeral service, according to aspects described herein.

Referring to FIG. 2, an example of a perspective view of the first video conference system 104 positioned in the funeral home 102 is depicted, according to aspects described herein. In this example, the immediate family members 110 are remotely interacting in real time with the passengers 112 in the vehicle 114, which has driven into the remote station 108 (see FIG. 3) during the funeral service. The casket 118 may be viewed by both the immediate family members 110 and the passengers 112.

For purposes herein, the term "immediate family members" is a flexible term that depends on the needs and wishes of the family and the deceased. Additionally, for example in the case of a pandemic where a government may put restrictions on who can be in the funeral home at any one time, "immediate family members" may allow for funeral home personnel to assess the needs of the individual family that they are serving and create boundaries for that family that fit within the states restrictions. An immediate family member can be anyone that is involved with the deceased's funeral arrangement, for example the funeral agent, the funeral director, family members or close friends. An immediate family member can also be any person in the normal hierarchy that is allowed to control final disposition of the deceased.

The first video conference system 104 may include a first video monitor 124, a first camera 126 and a first microphone 128 operatively connected together to enable video conferencing. The monitor 124 may be, for example, a large screen (e.g. 40 inches or larger) television monitor.

The first video conference system 104 may also include a first video conference control device 130. The first video conference control device 130 may be used to provide a user interface, and other features, for an operator of the first video conference system 104. Such a control device 130 might be, for example, a control screen or a laptop computer.

Additionally, the first video conference system 104 may include a first adjustable cart 132 that securely holds the monitor 124, camera 126, microphone 128 and video conference control system 130. The cart 132 may have an adjustable height and may be on casters that allows the cart 132 to be easily moved.

Figure 3:
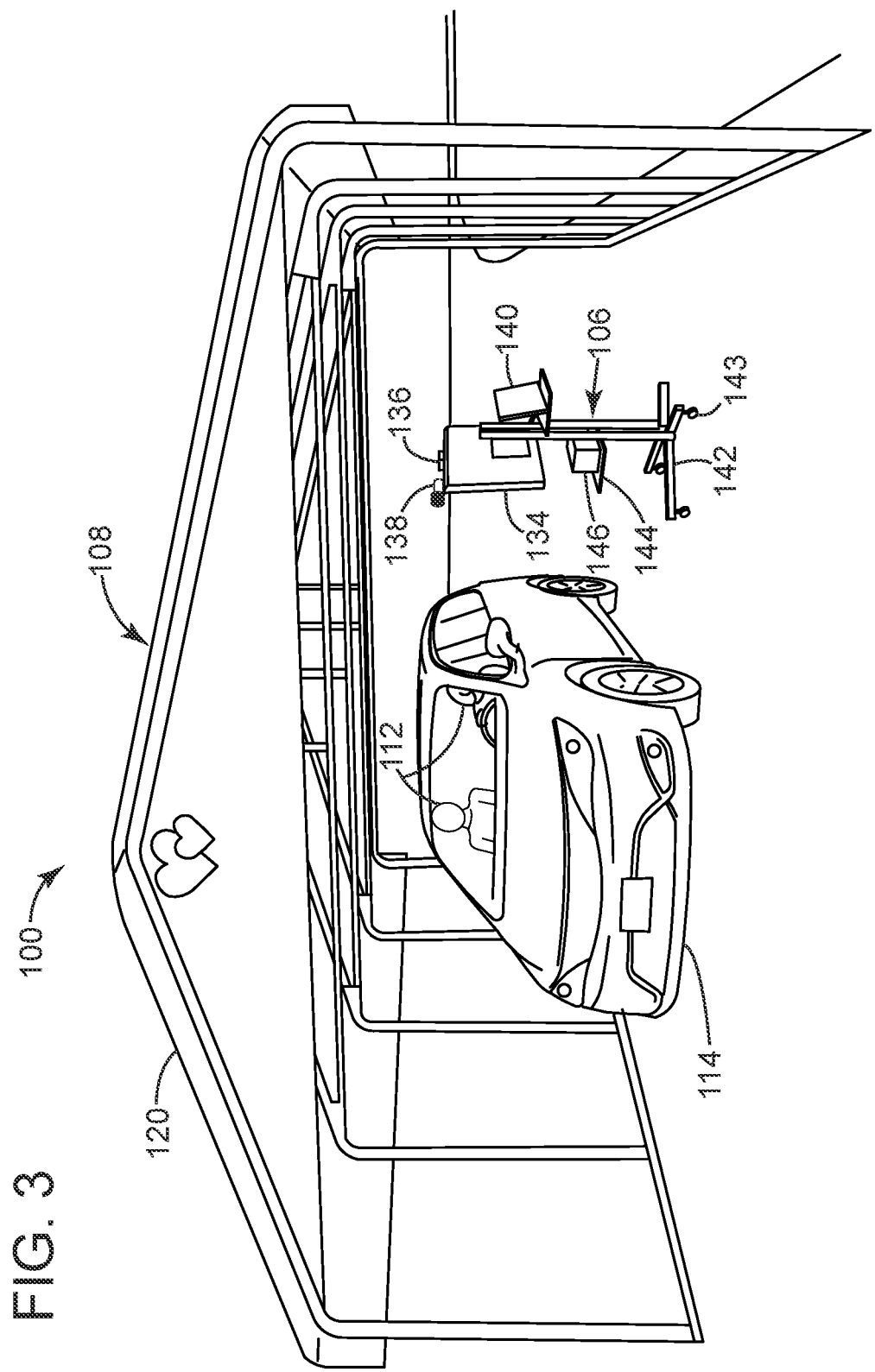
FIG. 3 depicts an example of the remote station of FIG. 1 including a car port, for a vehicle structure, to drive a vehicle into and out of, with the second video conference system positioned therein, wherein the passengers in the vehicle are remotely interacting in real time with the immediate family members during the funeral service, according to aspects described herein.

Referring to FIG. 3, an example of a perspective view of the remote station 108 of FIG. 1 is depicted according to aspects described herein. The remote station 108 in this example includes a vehicle structure 120 for driving the vehicle 114 into and out of. The vehicle structure, in this example, is a car port 120, which has the second video conference system 106 positioned therein. The passengers 112 in the vehicle 114 may be remotely interacting in real time with the immediate family members 110 during a funeral service.

The car port 120 may be any suitable size, such as for example 20 feet wide by 20 feet long by 7 feet tall. The car port 120 may be secured to the ground with either sand bags, anchors or other like securing devices depending on the type of surface the car port 120 is installed on. The car port 120 may have open air sides and a roof top to protect the passengers 112 from inclement weather. The car port 120 may be located in a parking lot 122 (see FIG. 1) of the funeral home 102 or other area of the funeral home's property that is convenient for a vehicle 114 to drive through. The car port 120 may be sized to allow a single vehicle 114 to enter at a time in order to provide privacy to the conversations between the passengers 112 of the vehicle 114 in the car port 120 and the family members 110 in the funeral home 102.

The second video conference system 106 may include a second video monitor 134, a second camera 136 and a second microphone 138 operatively connected together to enable video conferencing. The monitor 134 may be, for example, a large screen (e.g. 40 inches or larger) television monitor.

The second video conference system 106 may also include a second video conference control device 140. The second video conference control device 140 may be used to provide a user interface, and other features, for an operator of the second video conference system 106. Such a control device 140 might be, for example, a control screen or a laptop computer.

Additionally, the second video conference system 106 may include an adjustable cart 142 that securely holds the monitor 134, camera 136, microphone 138 and video conference control system 140. The cart 142 may have an adjustable height and may be on casters 143 that allows the cart 142 to be easily moved.

The cart 142 may also include shelving 144, or other appropriate support structures, to hold a container 146 sized to receive cards or gifts from the passengers 112 to be delivered to the family members 110. In some cases, the container 146 may be a simple cage with a pivoting lid to prevent items from being blown away. In other cases, the container may be a bulk item depository drop box with an electronic key.

The communications link 116 between the first and second video conference systems 104, 106 may be through an all-weather indoor/outdoor network cable. Alternatively, the communication link 116 may include a wireless internet connection between the first and second video conference systems 104, 106. Such a wireless connection may be via Wi-Fi, such as a 2.4 G to a 5.0 G or higher high speed Wi-Fi connection.

Though the above examples in FIGS. 1-3 illustrate the one or more remote individuals 112 as passengers in a vehicle 114, the remote individuals 112 may not be passengers. For example, the remote individuals 112 may be a group of people that are seated on benches in the remote station 108. Further, the remote station 108 need not include a car port 120 but may just be an open area where the second video conference system 106 is positioned.

Additionally, the remote station 108 may not include a car port 120 for a vehicle structure 120. Rather, the remote station 108 may include any appropriate vehicle structure 120 for a vehicle 114 to drive into and out of. Other examples of remote stations 108 having different vehicle structures 120 are described in greater detail herein.

Referring to FIG. 4, an example of a plan view of another embodiment of a system 200 for conducting remote communications at a funeral home is depicted, according to aspects described herein. In system 200, the first video conference system 104 is positioned in the funeral home 102 and the second video conference system 106 is positioned in the drive-through remote station 108, which is located at a second funeral home 202. The communications link 116 also includes, for example, a satellite link 204 to a satellite 206.

The remote station 108 does not have to be located in close proximity to the funeral home 102 but may be located anywhere in the world. In this case, the remote station 108 is located in second funeral home 202, that may not be conducting funeral services at the time the passengers 112 are utilizing the remote station 108 to virtually and remotely visit the funeral service in the funeral home 102.

Referring to FIG. 5, an example of a flow diagram of a method 300 of conducting remote communications at a funeral home 102 is depicted, according to aspects described herein. The method 300 begins at step 302 wherein the first video conference system 104 is positioned in the funeral home 102. At step 304 the second video conference system 106 is positioned in the remote station 108, which is remotely located from the funeral home 102.

The remote station 108 may be located on the property of the funeral home. Alternatively, the remote station 108 may be located anywhere in the world. For example, the remote station 108 may be located at another funeral home 202.

At step 306, the communications link 116 between the first and second video conference systems 104, 106 is established. The communications link 116 may be any appropriate technology or combination of technologies. For example, it may be by Wi-Fi, a network cable, or a satellite link 204 through a satellite 206. The communications link may also utilize any other well know wireless communications devices and technologies, such as cell phones and cell phone towers.

At step 308, one or more family members are allowed, or enabled, to gather at the funeral home 102 for a funeral service of a loved one. Additionally, at step 310, one or more remote individuals are allowed, or enabled, to gather at the remote station 108. At step 312, condolences are communicated from the one or more remote individuals 112 to the one or more family members 110 via the communication link 116 between the first video conference system 104 and second video conferencing system 106.

The condolences may be communicated in real time during the funeral service, wherein the remote individuals 112 and the family members 110 are communicating interactively during the funeral service. However, it is important to note that the scope to this invention also covers communicating condolences that are not done at the time of the funeral services.

For example, the condolences may be communicated by leaving a personal video message for one or more family members. The personal video message may be communicated prior to, or after, the funeral service. Additionally, the personal video message may be created and left at any time during a 24 hour period.

It is also important to note that the one or more remote individuals 112 may be passengers 112 in a vehicle 114, which drives to the remote station 108. The passengers 112 may communicate their condolences while remaining in the vehicle 114. Further the remote station 108 may include a car port 120 for the vehicle 114 to drive into.

A plurality of passengers in a plurality of vehicles may drive to the remote station at the same time. In that case the car port 120 of the remote station 108 may be sized to allow only one vehicle to enter the remote station at a time. Accordingly, passengers 112 in the one vehicle 114 in the remote station 108 may communicate condolences to the family members 110 privately from other passengers in the other vehicles of the plurality of vehicles.

The remote station 108 may also include a container 146 for the remote individuals 112 (whether they be passengers in a vehicle or pedestrians on foot) to leave cards, gifts or other items that can be delivered to the family members 110. The delivery of these items may be done during the funeral service. Alternatively, the delivery of these items may be done at any time prior to or after the funeral service. In the case of a pandemic, the cards, gifts or other items left in the container may be sanitized prior to delivery to the family members.

The systems 100, 200 and methods 300 enable passengers and other remote individuals 112 to communicate condolences to family members 110 safely and conveniently under trying circumstances. For example, in the case of a pandemic, the family members 110 can safely interact with remote passengers 112 during the funeral service while obeying government restrictions on social distancing. For handicapped people that have difficulty getting out of a car or other vehicle, they may stay safely seated in their vehicles and still virtually visit with the family members 110. Also, for friends of the deceased that are too far away to conveniently travel to the funeral home, they can communicate their condolences to the family members 110 remotely and in real time during the funeral service. Alternatively, remote individuals 112 may leave a video message for the family members 110 that may be kept by the family members as a personal keepsake.

Referring to FIG. 6, an example is depicted of a plan view of another system 400 for enabling one or more passengers 112 (seen in FIG. 3) in a vehicle 114 to conduct remote communications at a facility 402 (such as a funeral home 102), according to aspects described herein. Within system 400, the same or substantially similar items, persons and/or features as referenced previously herein are referred to with the same reference numbers.

The facility 402 is operable to host an event (such as a funeral service for a loved one) that is attended by event participants 404 (such as one or more family members 110 of the loved one). The system 400 includes a vehicle structure 406 that is operable to have vehicles 114 driven into and out of the vehicle structure. As illustrated in FIG. 6, the vehicle structure 406 includes an automatic entrance door 408 that is in a closed position, wherein a first vehicle 114A is approaching the automatic entrance door 408 and a second vehicle 114B is following behind the first vehicle 114A.

Though the systems 400 and 100 described herein are illustrated with reference to use with a funeral home 102 (as the facility 402) that is hosting a funeral service (as the event) for one or more family members 110 (as the event participants 404), the systems 400, 100 may be used with other facilities 402 hosting other events for other event participants 404. For example, the systems 400, 100 may be used to remotely communicate with such event participants 404 as patients in a hospital, wherein the event is medical treatment of the patients. Also, for example, the systems 400, 100 may be used to remotely communicate with such event participants 404 as residents in a nursing home, wherein the event is caring and housing the residents. Also, by way of a non-limiting example, the systems 400, 100 may be used to remotely communicate with event participants 404 that are members of a wedding party, wherein the event is a wedding. Additionally, by way of example, the systems 400, 100 may be used to remotely communicate with event participants 404 that are family members of a graduating student, wherein the event is a graduation ceremony for the graduating student. Additionally, by way of example, the systems 400, 100 may be used to remotely communicate with event participants 404 that are family members and/or friends, wherein the event is a funeral service and the facility is a private residence. However, for purposes of clarity and simplicity, the system 400 will be described herein with reference to the facility 402 being a funeral home 102, the event being a funeral service for a loved one and the event participants 404 being family members of a loved one 110.

The vehicle structure 406 may be of any construction, portable or stationary, that is suitable for vehicles to drive into and out of. The vehicle structure 406 may be, for example, a car port (as illustrate in FIG. 3), a tent, a wooded or brick structure or the like. The vehicle structure 406 may or not may have walls to keep the elements out. The vehicle structure 406 may also include heating, air conditioning and/or lighting to better provide comfort to passengers 112 while they are communicating with event participants 404.

The system 400 is similar to system 100, wherein the system 400 includes a first video conference system 104 positioned in the funeral home 102 (i.e., facility 402) and a second video conference system 106 positioned in a vehicle structure 406 remotely located from the funeral home 102. The first video conference system 104 may include a first video monitor 124, a first camera 126, a first microphone 128 and a first video conferencing control system 130. The first video conference system 104 may be positioned on a first adjustable cart 132, much like the first video conference system 104 illustrated in FIG. 2. The second video conference system 106 may include a second video monitor 134, a second camera 136, a second microphone 138 and a second video conferencing control system 140. The second video conference system 106 may be positioned on a second adjustable cart 143, much like the second video conference system illustrated in FIG. 3.

The vehicle structure 406 is operable to have vehicles 114 (such as vehicles 114A and 114B) driven into and out of the vehicle structure 406. A communication link 116 may be established between the first 104 and second 106 video conference systems. One or more family members 110 may gather at the funeral home 102 for a funeral service of a loved one (in this case the loved one is in casket 118). One or more passengers 112 may drive in the first vehicle 114A into the vehicle structure 406. The one or more passengers 112 and the one or more family members 110 may communicate between each other via the communication link 116, while the one or more passengers 112 remain in the first vehicle 114A.

The system 400 is operable to interactively communicate between the one or more passengers 112 and the one or more family members 110 during the funeral service. The system 400 is also operable to enable the one or more passengers 112 to leave a recorded a message on the second video conferencing system 106 for the one or more family members 110 at any time during a 24-hour period.

The automatic entrance door 408 is operable to be moved from a closed position to an open position by a door control system 410. The door control system 410 may be in electronic communication with a first sensor 412, a second sensor 414 and a height sensor 416. The height sensor 416 may be positioned on the outside of the vehicle structure 406 proximate the automatic entrance door 408. The height sensor is operable to sense a height of the first vehicle 114A prior to the first vehicle 114A driving into the vehicle structure 406. If the height of the first vehicle 114A that is sensed by the height sensor 414 exceeds a predetermined height limit for the first vehicle 114A to safely drive into the vehicle structure 406, a warning signal 418 is transmitted to the passenger 112 that is also the driver 419 of the first vehicle 114A not to enter the vehicle structure 406. The transmitted warning signal 418 may be visual (such as a lighted warning sign or a red light) or audible (such as a pre-recorded warning from a loud speaker). Additionally, the door control system 410 may be programmed to not open the automatic entrance door 408 if the height of the first vehicle 114A exceeds the predetermined height limit.

The first sensor 412 may be positioned on the outside of the vehicle structure 406 proximate the automatic entrance door 408. The first sensor 412 is operable to sense the first vehicle 114A as the first vehicle 114A approaches a proximity of the automatic entrance door 408. The second sensor 414 may be position on the inside of the vehicle structure 406. The second sensor 414 is operable to sense whether or not another vehicle is positioned in the vehicle structure 406 as the first vehicle 114A approaches the proximity of the automatic entrance door 408. The sensing information from the first and second sensors 412 and 414 may be transmitted to the door control system 410, which may be programmed to automatically open the automatic entrance door 408 only if another vehicle is not positioned in the vehicle structure 406.

The first, second and height sensors 412, 414, 416 may utilize several technologies to sense the first vehicle 114A as it approaches the vehicle structure, sense if another vehicle is positioned within the vehicle structure, and sense the height of the first vehicle 114A respectively. For example, the first, second and height sensors 412, 414, 416 may be one or more combinations of ultrasonic sensors, radio frequency sensors, laser sensors or the like.

As will be explained in greater detail herein, the vehicle structure 406 may also include a passenger identification system 420, which may include an automatic barrier gate system 422. The automatic barrier gate system 422 may include an automatic barrier gate operator 423, which controls the raising and lowering of an automatic barrier gate arm 425. The passenger identification system 420 may be utilized to obtain identification information from the passengers 112 prior to communicating with the event participants 404.

The vehicle structure 406 may also include an automatic exit door 424. The automatic exit door 424 may open automatically as a vehicle 114 is exiting the vehicle structure 406.

The vehicle structure 406 may also include various tables 426 and/or shelves 428 or other support devices (such as hooks, for example). The tables 426, shelves 428 or other support devices may be used to display memorabilia related to the event. For example, in a funeral service, the memorabilia may be photos or personal items of the deceased loved one.

Referring the FIG. 7, an example is depicted of a plan view of the system 400, wherein the automatic entrance door 408 is in an open position and the passengers 112 of the first vehicle 114A are being queried for identification information by the passenger identification system 420, according to aspects described herein. The passenger identification system 420 may include the automatic barrier gate system 422 to stop the first vehicle 114A at a predetermined position within the vehicle structure 406. At the predetermined position, the first vehicle 114A may be partially or wholly within the vehicle structure 406. If the vehicle 114A is wholly within the vehicle structure 406, the automatic entrance door 408 may be closed for additional privacy and/or protection from the elements.

The passenger identification system 420 may also include a microphone 430, a speaker 432 and an identification control system 434. The identification control system 434 may include a computerized system that is operable to utilize the speaker 432 and microphone 430 to prompt the passengers 112 in the vehicle 114A for identification information, once the first vehicle 114A has stopped in front of the barrier gate 422.

The identification control system 434 may be operable to establish a communication link 436 (similar to communication link 116) with the first video conference system 104. Accordingly, the identification control system 434 may be operable to provide the first video conference system 104 the passenger identification information to the family members 110 (or other event participants 404 in other events) prior to the passengers 112 communicating with the family members 110. This will give advanced notice to the family members 110 of the identity of the passengers 112. For example, once the first video conference system 104 receives the passenger identification information, it may provide an audible prompt (for example a bell or chime), which informs the family members 110 that the identification information of the passengers 112 is available and that the passengers 112 are requesting to communicate with the family members 110.

The family member can then send a signal back to the identification control system 434, via the communication link 436, accepting the request to communicate. The identification control system 434 will then send a signal to the automatic barrier gate system 422 to command the automatic barrier gate operator 423 to raise its automatic barrier gate arm 425 and let the first vehicle 114A to move to the second video conference system 106.

Though the passenger identification system 420 is illustrate in the specific configuration of FIG. 7, other configurations are also within the scope of this invention. For example, there may be no automatic barrier gate system 422, but rather a verbal or audio signal may instruct the driver 419 where to stop to enable the passenger identification system 420 to obtain the passenger identification information. Also, by way of example, the passenger identification system 420 may be incorporated into the second video conference system 106, wherein the vehicle 114A only makes one stop in the vehicle structure 406 and the automatic barrier gate system 422 is not needed.

Referring to FIG. 8, an example is depicted of a plan view of the system 400, wherein the first vehicle 114A is within the vehicle structure 406 and the driver 419 of the vehicle 114A is being instructed to position the vehicle 114A within the field of view of a camera 136 of the system 400, according to aspects described herein.

For example, the driver 419 of the first vehicle 114A may pull up to the second video conference system 106 but inadvertently not be fully within the field of view of camera 136, so not all of the passengers 112 may be seen by the family members 110. In that case, the second video conference system 106 (or other automated system separate from the second video conference system 106) may be programmed to sense the position of the vehicle 114A (for example by utilizing the second sensor 414) and instruct the driver 419 of the first vehicle 114A to move the first vehicle to a position within a field of view of a camera 136 of the second video conference system 106. This will better enable the one or more passengers 112 to be seen by the one or more family members 110 when communicating through the communication link 116.

Alternatively, the sensor 414 can sense when the vehicle 114A is in the correct position and transmit a stop signal to the driver 419. The stop signal can be visual (for example a red light or lighted sign) or audio (for example a recorded stop command over a speaker).

Alternatively, second video conference system 106 may be programmed to display a picture of the vehicle 114A on the video monitor 134 as it is viewed from the camera 136. The second video conference system 106 can then instruct the driver 419 to move the vehicle 114A, forward or backward, until the entire vehicle 114A is shown on the monitor 134 and, therefore, is fully in the field of view of the camera 136.

Note, that the second vehicle 114B is now close enough to the automatic entrance door 408 (as sensed by the first sensor 412) and is within the safe height limit (as sensed by the height sensor 416) for the automatic entrance door 408 to be opened. However, the automatic entrance door 408 will advantageously remain in its closed position until the second sensor 414 indicates that the first vehicle 114A has left the vehicle structure 406. This is advantageous in that the system 400 protects the privacy of the communications between the passengers 112 of the first vehicle 114A and the family members 110 during the entire visitation of the first vehicle 114A.

Referring to FIG. 9, an example is depicted of a plan view of the system 400, wherein the first vehicle 114A has exited the vehicle structure 406 though the automatic exit door 424 and the automatic entrance door 408 is in its open position to allow the second vehicle 114B to enter the vehicle structure 406. Therefore, the entire method of remote communication can start again for the second vehicle 114B.

The method of remote communication will continue until there are no more vehicles 114 in line waiting to communicate with the family members 110. In that case, the second sensor 414 may sense if the vehicle structure 406 is empty of any vehicles 114 for a predetermined amount of non-visitor time during the funeral service. The predetermined amount of non-vehicle time may be, for example, from 30 seconds to a few minutes. The second sensor 414 may then send a mute signal to the first or second video conference systems 104, 106 to mute the video conference systems 104, 106 such that the one or more family members 110 are advantageously not disturbed by noises or images from the empty vehicle structure 406. The video systems 104, 106 may unmute once another vehicle 114 enters the vehicle structure 406.

Referring to FIG. 10, an example is depicted of a perspective view of a computer application 438 of the system 400 that may be installed on a smart device 440, according to aspects described herein. The smart device 440 may be a smart phone, a tablet, or the like. A communication link 442 may be established between the second video conference system 106 and the smart device 440.

The second video conference system 106 may be operable to record a message from the one or more passengers 112 for the one or more event participants 110 at any time during a 24-hour period. The computer application 438 may be in communication with the second video conference system via the communication link 442. The computer application 438 may be operable to alert the one or more family members 110 (or other event participants 404) that the message has been recorded and is available to be retrieved. The family members 110 may download the message on the smart device 440 or go to the vehicle structure 406 to retrieve the message.

Referring to FIG. 11, an example is depicted of a perspective view of a locker system 444 of the system 400, according to aspects described herein. The locker system 444 includes a plurality of lockers 446 and a locker control system 448.

The plurality of lockers 446 may be disposed in the vehicle structure 406. Each locker 446A-446D of the plurality of lockers 446 is operable to receive an item of value to the one or more family members 110 (or other event participants 404). The item of value may be, for example, the cremated ashes of a loved one, keepsakes of a loved one or the like.

The locker control system 448 is in communication with the plurality of lockers 446. The locker control system 448 is also operable to receive a locker code input by a family member 110 (or other an event participant 404). The locker code is associated with a predetermined locker 446A-446D of the plurality of lockers 446. The locker code may, for example, be given to the family member 110 by a funeral director of the funeral home 102, who has placed the item of value into the predetermined locker associated with the locker code.

When the one or more family members 110 (or other event participants 404) input the locker code into the locker control system 448, the locker control system 448 automatically opens the predetermined locker 446A-446D associated with the locker code to enable the one or more family members 110 (or other event participants 404) to retrieve the item of value. In this way, a family member 110 may advantageously retrieve items of value after the funeral home 102 has closed.

Alternatively, a passenger 112 may put a gift, or other item, into one of the plurality of lockers 446 and alert the funeral director or family members as to which locker the item was put into. The funeral director or family members 110 may later retrieve the item by inputting the proper locker code into the locker control system 448.

Additionally, alerting the family members 110 that an item of value has been put into one of the plurality of lockers 446 and providing the locker code associated with the locker may be done via the computer application 438.

Referring to FIG. 12, example is depicted of a plan view of another system 500 for enabling one or more passengers 112 in a vehicle 114 to conduct remote communications at a facility 402, which is hosting an event that is attended by event participants 404, according to aspects described herein. In system 500, the facility 402 is a hospital 502 and the event participants are patients 504 in the hospital 502. The event may be medical treatment of the patients 504 and the passengers 112 in the vehicles 114 may be friends and family of the patients 504 being treated. The first video conference system 104 may be wheeled from one hospital room 506 to another 508, 510 to enable multiple patients 504 to be remotely visited by multiple groups of friends and family that are passengers 112 in the vehicles 114.

In system 500, the second video conference system 106 may be positioned in the vehicle station 406, which may be located at a funeral home parking lot or other location remote from the hospital 502. The communications links 116, 436 may include, for example, a satellite link 204 to a satellite 206. The hospital 502 does not have to be located in close proximity to the vehicle structure 406 but may be located anywhere in the world.

Alternatively, the vehicle station 406 may have an articulated structure that allows the vehicle station to be folded and transported via, for example, a pick-up truck. The second video conference system 106 and/or passenger identification system 420 may also be transported in the same way. Accordingly, the vehicle structure 406 may be transported to be within close proximity of the hospital 502 (for example, in the hospital parking lot).

Often friends and family members of critically ill patients take up residence (such as, for example, by renting an apartment or checking into a hotel) to be close to the hospital that the patient is being treated at. However, the patient may have restrictions on in-person visits due to the patient's illness (for example, the illness may be contagious). By transporting a portable, foldable articulated vehicle structure 406 to be within a close proximity of the hospital, the friends and family members advantageously do not have to travel long distances to be able to remotely visit the patient.

Referring to FIG. 13, an example is depicted of a method 600 for conducting remote communications at a facility 402 hosting an event, according to aspects described herein. The method 600 begins at 602 by providing a first video conference system 104 positioned in a facility 402. At 604, a second video conference system 106 is provided and positioned in a vehicle structure 406 remotely located from the facility 402. The vehicle structure 406 is operable to have vehicles 114 driven into and out of the vehicle structure 406. At 606, a communication link is established between the first and second video conference systems 104, 106.

At 608, one or more event participants 404 are enabled to gather at the facility 402 to participate in an event. At 610, One or more passengers 112 in a first vehicle 114A drive into the vehicle structure 406. At 612, the one or more passengers 112 and the one or more event participants 404 communicate via the communication link 116, while the one or more passengers 112 remain in the first vehicle 114A.

At 614, the one or more event participants 404 may interactively communicate during the event. Alternatively, the passengers 112 may leave a recorded a message on the second video conferencing system 106 for the event participants 404 at any time during a 24-hour period.

At 616, the one or more event participants 404 may be alerted, via a computer application 438 installed on a smart device 440, that the message has been recorded and is available to be retrieved.

Referring to FIG. 14, an example is depicted of a method 700 for conducting remote communications at a facility 402 hosting an event, according to aspects described herein. The method 700 is a continuation of method 600.

The method 700 begins at 702 by sensing, via a sensor 416, a height of the first vehicle 114A prior to driving into the vehicle structure 406. A warning signal is transmitted to a driver 419 of the first vehicle 114A, if the height of the first vehicle 114A that is sensed by the sensor 416 exceeds a predetermined height limit for the first vehicle 114A to safely drive into the vehicle structure 406.

At 704, a first sensor 412 senses the first vehicle 114A as the first vehicle 114A approaches a proximity of an automatic entrance door 408 to the vehicle structure 406. A second sensor 414 senses whether or not another vehicle is positioned in the vehicle structure 406 as the first vehicle 114A approaches the proximity of the automatic entrance door 408. The automatic entrance door 408 is automatically opened to enable the first vehicle 114A to drive into the vehicle structure 406 only if another vehicle is not positioned in the vehicle structure 406.

At 706, an automated system 420 prompts the one or more passengers 112 for identification information as the first vehicle 114A enters the vehicle structure 406 during the event. The first video conference system 104 provides the identification information to the one or more event participants 404 prior to the communicating with the passengers 112, to give advanced notice to the one or more event participants 404 of the identity of one or more passengers 112.

At 708, an automated system 106 instructs a driver 419 of the first vehicle 114A to move the first vehicle 114A to a position within a field of view of a camera 136 of the second video conference system 106 to better enable the one or more passengers 112 to be seen by the one or more event participants 404 during communications between the passengers 112 and the event participants 404.

At 710, a sensor 414 senses if the vehicle structure 406 is empty of any vehicles 114 for a predetermined amount of non-visitor time during the event. The first or the second video conference systems 104, 106 are muted after the amount of non-visitor time has elapsed such that the one or more event participants 404 are not disturbed by noises or images from the empty vehicle structure 406.

Referring to FIG. 15, an example is depicted of a method 800 for conducting remote communications at a facility 402 hosting an event, according to aspects described herein. The method 800 is a continuation of method 600.

The method 800 begins at 802, by installing a plurality of lockers 446 in the vehicle structure 406. At 804, an item of value to the one or more event participants is placed in a predetermined locker 446A-446D of the plurality of lockers 446.

At 806, a locker code is given to the one or more event participants 404. The locker code is associated with the predetermined locker 446A-446D. At 808, the one or more event participants 404 input the locker code into a locker control system 448 installed within the vehicle structure 406. At 810, the locker control system 448 automatically opens the predetermined locker 446A-446D to enable the one or more event participants 404 to retrieve the item of value.

It should be appreciated that all combinations of the foregoing concepts and additional concepts discussed in greater detail herein (provided such concepts are not mutually inconsistent) are contemplated as being part of the inventive subject matter disclosed herein and to achieve the benefits and advantages as described herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A method for conducting remote communications at a funeral home, the method comprising:
    providing a first video conference system positioned in a funeral home;
    providing a second video conference system positioned in a vehicle structure remotely located from the funeral home, the vehicle structure operable to have vehicles driven into and out of the vehicle structure;
    establishing a communication link between the first and second video conference systems;
    enabling one or more family members to gather at the funeral home for a funeral service of a loved one;
    driving one or more passengers in a first vehicle into the vehicle structure;
    instructing, via an automated system, a driver of the first vehicle to move the first vehicle to a position within a field of view of a camera of the second video conference system to better enable the one or more passengers to be seen by the one or more family members during a communicating; and
    communicating, while the one or more passengers remain in the first vehicle, between the one or more passengers and the one or more family members via the communication link.

2. The method of claim 1, wherein the communicating comprises:
    interactively communicating between the one or more passengers and the one or more family members during the funeral service.

3. The method of claim 1, wherein the communicating comprises:
    the one or more passengers recording a message on the second video conferencing system for the one or more family members at any time during a 24-hour period.

4. The method of claim 3, comprising:
    alerting, via a computer application installed on a smart device, the one or more family members that the message has been recorded and is available to be retrieved.

5. The method of claim 1, comprising:
    sensing, via a sensor, a height of the first vehicle prior to driving into the vehicle structure; and
    transmitting a warning signal to a driver of the first vehicle, if the height of the first vehicle that is sensed by the sensor exceeds a predetermined height limit for the first vehicle to safely drive into the vehicle structure.

6. The method of claim 1, comprising:
    sensing, via a sensor, if the vehicle structure is empty of any vehicles for a predetermined amount of non-visitor time during the funeral service;
    muting the first or the second video conference system after the amount of non-visitor time has elapsed such that the one or more family members are not disturbed by noises or images from the empty vehicle structure.

7. The method of claim 1, comprising:
    sensing, via a first sensor, the first vehicle as the first vehicle approaches a proximity of an automatic entrance door to the vehicle structure;
    sensing, via a second sensor, whether or not another vehicle is positioned in the vehicle structure as the first vehicle approaches the proximity of the automatic entrance door; and
    automatically opening the automatic entrance door to enable the first vehicle to drive into the vehicle structure only if another vehicle is not positioned in the vehicle structure.

8. The method of claim 1, comprising:
    prompting, via an automated system, the one or more passengers for identification information as the first vehicle enters the vehicle structure during the funeral service;
    providing, via the first video conference system, the identification information to the one or more family members prior to the communicating to give advanced notice to the one or more family members of the identity of the one or more passengers.

9. The method of claim 1, comprising:
    installing a plurality of lockers in the vehicle structure;
    placing an item of value to the one or more family members in a predetermined locker of the plurality of lockers;
    giving a locker code to the one or more family members, the locker code associated with the predetermined locker;
    the one or more family members inputting the locker code into a locker control system installed within the vehicle structure; and
    the locker control system automatically opening the predetermined locker to enable the one or more family members to retrieve the item of value.

10. A method for conducting remote communications at a facility hosting an event, the method comprising:
    providing a first video conference system positioned in a facility;
    providing a second video conference system positioned in a vehicle structure remotely located from the facility, the vehicle structure operable to have vehicles driven into and out of the vehicle structure;
    establishing a communication link between the first and second video conference systems;

enabling one or more event participants to gather at the facility to participate in an event;

driving one or more passengers in a first vehicle into the vehicle structure;

instructing, via an automated system, a driver of the first vehicle to move the first vehicle to a position within a field of view of a camera of the second video conference system to better enable the one or more passengers to be seen by the one or more event participants during a communicating; and communicating, while the one or more passengers remain in the first vehicle, between the one or more passengers and the one or more event participants via the communication link.

11. The method of claim 10, wherein the communicating comprises:

interactively communicating between the one or more passengers and the one or more event participants during the event.

12. The method of claim 10, wherein the communicating comprises:

the or more passengers recording a message on the second video conferencing system for the one or more event participants at any time during a 24-hour period.

13. The method of claim 12, comprising:

alerting, via a computer application installed on a smart device, the one or more event participants that the message has been recorded and is available to be retrieved.

14. The method of claim 10, comprising:

sensing, via a sensor, a height of the first vehicle prior to driving into the vehicle structure; and transmitting a warning signal to a driver of the first vehicle, if the height of the first vehicle that is sensed by the sensor exceeds a predetermined height limit for the first vehicle to safely drive into the vehicle structure.

15. The method of claim 10, comprising:

sensing, via a sensor, if the vehicle structure is empty of any vehicles for a predetermined amount of non-visitor time during the event;

muting the first or the second video conference system after the amount of non-visitor time has elapsed such that the one or more event participants are not disturbed by noises or images from the empty vehicle structure.

16. The method of claim 10, comprising:

sensing, via a first sensor, the first vehicle as the first vehicle approaches a proximity of an automatic entrance door to the vehicle structure;

sensing, via a second sensor, whether or not another vehicle is positioned in the vehicle structure as the first vehicle approaches the proximity of the automatic entrance door; and automatically opening the automatic entrance door to enable the first vehicle to drive into the vehicle structure only if another vehicle is not positioned in the vehicle structure.

17. The method of claim 10, comprising:

prompting, via an automated system, the one or more passengers for identification information as the first vehicle enters the vehicle structure during the event;

providing, via the first video conference system, the identification information to the one or more event participants prior to the communicating to give advanced notice to the one or more event participants of the identity of one or more passengers.

18. The method of claim 10, comprising:

installing a plurality of lockers in the vehicle structure;

placing an item of value to the one or more event participants in a predetermined locker of the plurality of lockers;

giving a locker code to the one or more event participants, the locker code associated with the predetermined locker;

the one or more event participants inputting the locker code into a locker control system installed within the vehicle structure; and the locker control system automatically opening the predetermined locker to enable the one or more event participants to retrieve the item of value.

19. A system for conducting remote communications at a facility hosting an event, the system comprising:

a first video conference system positioned in a facility;

a second video conference system positioned in a vehicle structure remotely located from the facility, the vehicle structure operable to have vehicles driven into and out of the vehicle structure;

a communication link established between the first and second video conference systems, wherein the communication link is operable to enable communication between one or more passengers of a first vehicle driven into the vehicle structure and one or more event participants gathered at the facility to participate in an event, while the one or more passengers remain in the first vehicle; and an automated system operable to instruct a drive of the first vehicle to move the first vehicle to a position within a field of view of a camera of the second video conference system to better enable the one or more passengers to be seen by the one or more event participants when the one or more passengers are communicating with the one or more event participants.

20. The system of claim 19, comprising:

the first video conference system comprising a first video monitor, a first camera and a first microphone; and the second video conference system comprising a second video monitor, a second camera and a second microphone.

21. The system of claim 19, comprising:

the second video conference system operable to record a message from the one or more passengers for the one or more event participants at any time during a 24-hour period; and a computer application installed on a smart device, the computer application in communication with the second video conference system, the computer application operable to alert the one or more event participants that the message has been recorded and is available to be retrieved.

22. The system of claim 19, comprising:

a sensor operable to sense a height of the first vehicle prior to driving into the vehicle structure; and a transmitter operable to transmit a warning signal to a driver of the first vehicle, if the height of the first vehicle that is sensed by the sensor exceeds a predetermined height limit for the first vehicle to safely drive into the vehicle structure.

23. The system of claim 19, comprising:

a sensor operable to sense if the vehicle structure is empty of any vehicles for a predetermined amount of non-visitor time during the event; and the first or the second video conference system operable to receive a mute signal from the sensor to mute the first or second video conference system after the amount of non-visitor time has elapsed such that the one or more event participants are not disturbed by noises or images from the empty vehicle structure.

24. The system of claim 19, comprising:
an automatic entrance door positioned on the vehicle structure;
a first sensor operable to sense the first vehicle as the first vehicle approaches a proximity of the automatic entrance door;
a second sensor operable to sense whether or not another vehicle is positioned in the vehicle structure as the first vehicle approaches the proximity of the automatic entrance door; and
wherein the automatic entrance door is operable to automatically open to enable the first vehicle to drive into the vehicle structure only if another vehicle is not positioned in the vehicle structure.

25. The system of claim 19, comprising:
an automated system operable to automatically prompt the one or more passengers for identification information as the first vehicle enters the vehicle structure during the event; and
wherein the first video conference system is in communication with the automated system, the first video conference system being operable to provide the identification information to the one or more event participants prior to the one or more event participants communicating with the one or more passengers.

26. The system of claim 19, comprising:
a plurality of lockers disposed in the vehicle structure, each locker of the plurality of lockers operable to receive an item of value to the one or more event participants;
a locker control system in communication with the plurality of lockers, the locker control system operable to receive a locker code input by an event participant, the locker code being associated with a predetermined locker of the plurality of lockers;
wherein, when the one or more event participants input the locker code into the locker control system, the locker control system automatically opens the predetermined locker associated with the locker code to enable the one or more event participants to retrieve the item of value.

27. The system of claim 19, wherein:
the facility is a funeral home;
the event is a funeral service for a loved one; and
the one or more event participants are one or more family members of the loved one.

28. A method for conducting remote communications at a funeral home, the method comprising:
providing a first video conference system positioned in a funeral home;
providing a second video conference system positioned in a vehicle structure remotely located from the funeral home, the vehicle structure operable to have vehicles driven into and out of the vehicle structure;
establishing a communication link between the first and second video conference systems;
enabling one or more family members to gather at the funeral home for a funeral service of a loved one;
driving one or more passengers in a first vehicle into the vehicle structure;
communicating, while the one or more passengers remain in the first vehicle, between the one or more passengers and the one or more family members via the communication link;
sensing, via a sensor, if the vehicle structure is empty of any vehicles for a predetermined amount of non-visitor time during the funeral service; and
muting the first or the second video conference system after the amount of non-visitor time has elapsed such that the one or more family members are not disturbed by noises or images from the empty vehicle structure.

29. A method for conducting remote communications at a funeral home, the method comprising:
providing a first video conference system positioned in a funeral home;
providing a second video conference system positioned in a vehicle structure remotely located from the funeral home, the vehicle structure operable to have vehicles driven into and out of the vehicle structure;
establishing a communication link between the first and second video conference systems;
enabling one or more family members to gather at the funeral home for a funeral service of a loved one;
sensing, via a first sensor, a first vehicle as the first vehicle approaches a proximity of an automatic entrance door to the vehicle structure;
sensing, via a second sensor, whether or not another vehicle is positioned in the vehicle structure as the first vehicle approaches the proximity of the automatic entrance door;
automatically opening the automatic entrance door to enable the first vehicle to drive into the vehicle structure only if another vehicle is not positioned in the vehicle structure
driving one or more passengers in the first vehicle into the vehicle structure; and
communicating, while the one or more passengers remain in the first vehicle, between the one or more passengers and the one or more family members via the communication link.

30. A method for conducting remote communications at a funeral home, the method comprising:
providing a first video conference system positioned in a funeral home;
providing a second video conference system positioned in a vehicle structure remotely located from the funeral home, the vehicle structure operable to have vehicles driven into and out of the vehicle structure;
establishing a communication link between the first and second video conference systems;
enabling one or more family members to gather at the funeral home for a funeral service of a loved one;
driving one or more passengers in a first vehicle into the vehicle structure;
prompting, via an automated system, the one or more passengers for identification information as the first vehicle enters the vehicle structure during the funeral service;
providing, via the first video conference system, the identification information to the one or more family members prior to the communicating to give advanced notice to the one or more family members of the identity of the one or more passengers; and
communicating, while the one or more passengers remain in the first vehicle, between the one or more passengers and the one or more family members via the communication link.

31. A method for conducting remote communications at a facility hosting an event, the method comprising:
providing a first video conference system positioned in a facility;

providing a second video conference system positioned in a vehicle structure remotely located from the facility, the vehicle structure operable to have vehicles driven into and out of the vehicle structure;

establishing a communication link between the first and second video conference systems;

enabling one or more event participants to gather at the facility to participate in an event;

driving one or more passengers in a first vehicle into the vehicle structure;

communicating, while the one or more passengers remain in the first vehicle, between the one or more passengers and the one or more event participants via the communication link;

sensing, via a sensor, if the vehicle structure is empty of any vehicles for a predetermined amount of non-visitor time during the event; and muting the first or the second video conference system after the amount of non-visitor time has elapsed such that the one or more event participants are not disturbed by noises or images from the empty vehicle structure.

32. A method for conducting remote communications at a facility hosting an event, the method comprising:

providing a first video conference system positioned in a facility;

providing a second video conference system positioned in a vehicle structure remotely located from the facility, the vehicle structure operable to have vehicles driven into and out of the vehicle structure;

establishing a communication link between the first and second video conference systems;

enabling one or more event participants to gather at the facility to participate in an event;

sensing, via a first sensor, a first vehicle as the first vehicle approaches a proximity of an automatic entrance door to the vehicle structure;

sensing, via a second sensor, whether or not another vehicle is positioned in the vehicle structure as the first vehicle approaches the proximity of the automatic entrance door;

automatically opening the automatic entrance door to enable the first vehicle to drive into the vehicle structure only if another vehicle is not positioned in the vehicle structure;

driving one or more passengers in the first vehicle into the vehicle structure; and communicating, while the one or more passengers remain in the first vehicle, between the one or more passengers and the one or more event participants via the communication link.

33. A method for conducting remote communications at a facility hosting an event, the method comprising:

providing a first video conference system positioned in a facility;

providing a second video conference system positioned in a vehicle structure remotely located from the facility, the vehicle structure operable to have vehicles driven into and out of the vehicle structure;

establishing a communication link between the first and second video conference systems;

enabling one or more event participants to gather at the facility to participate in an event;

driving one or more passengers in a first vehicle into the vehicle structure;

prompting, via an automated system, the one or more passengers for identification information as the first vehicle enters the vehicle structure during the event;

providing, via the first video conference system, the identification information to the one or more event participants prior to communicating to give advanced notice to the one or more event participants of the identity of one or more passengers; and communicating, while the one or more passengers remain in the first vehicle, between the one or more passengers and the one or more event participants via the communication link.

34. A system for conducting remote communications at a facility hosting an event, the system comprising:

a first video conference system positioned in a facility;

a second video conference system positioned in a vehicle structure remotely located from the facility, the vehicle structure operable to have vehicles driven into and out of the vehicle structure;

an automatic entrance door positioned on the vehicle structure;

a first sensor operable to sense a first vehicle as the first vehicle approaches a proximity of the automatic entrance door;

a second sensor operable to sense whether or not another vehicle is positioned in the vehicle structure as the first vehicle approaches the proximity of the automatic entrance door; and a communication link established between the first and second video conference systems;

wherein the automatic entrance door is operable to automatically open to enable the first vehicle to drive into the vehicle structure only if another vehicle is not positioned in the vehicle structure; and wherein the communication link is operable to enable communication between one or more passengers of the first vehicle driven into the vehicle structure and one or more event participants gathered at the facility to participate in an event, while the one or more passengers remain in the first vehicle.

35. A system for conducting remote communications at a facility hosting an event, the system comprising:

a first video conference system positioned in a facility;

a second video conference system positioned in a vehicle structure remotely located from the facility, the vehicle structure operable to have vehicles driven into and out of the vehicle structure;

a communication link established between the first and second video conference systems, wherein the communication link is operable to enable communication between one or more passengers of a first vehicle driven into the vehicle structure and one or more event participants gathered at the facility to participate in an event, while the one or more passengers remain in the first vehicle; and an automated system operable to automatically prompt the one or more passengers for identification information as the first vehicle enters the vehicle structure during the event, wherein the first video conference system is in communication with the automated system, the first video conference system being operable to provide the identification information to the one or more event participants prior to the one or more event participants communicating with the one or more passengers.

36. A system for conducting remote communications at a facility hosting an event, the system comprising:

a first video conference system positioned in a facility;

a second video conference system positioned in a vehicle structure remotely located from the facility, the vehicle structure operable to have vehicles driven into and out of the vehicle structure;

a communication link established between the first and second video conference systems, wherein the communication link is operable to enable communication between one or more passengers of a first vehicle driven into the vehicle structure and one or more event participants gathered at the facility to participate in an event, while the one or more passengers remain in the first vehicle;

a plurality of lockers disposed in the vehicle structure, each locker of the plurality of lockers operable to receive an item of value to the one or more event participants; and a locker control system in communication with the plurality of lockers, the locker control system operable to receive a locker code input by an event participant, the locker code being associated with a predetermined locker of the plurality of lockers;

wherein, when the one or more event participants input the locker code into the locker control system, the locker control system automatically opens the predetermined locker associated with the locker code to enable the one or more event participants to retrieve the item of value.

\* \* \* \* \*